(12) United States Patent
Miyabe

(10) Patent No.: US 7,710,883 B2
(45) Date of Patent: May 4, 2010

(54) PATH SETTING METHOD AND COMMUNICATION APPARATUS IN COMMUNICATION NETWORK PERFORMING COMMUNICATIONS THROUGH A PLURALITY OF LAYERS

(75) Inventor: Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 11/151,326

(22) Filed: Jun. 13, 2005

(65) Prior Publication Data
US 2005/0232231 A1  Oct. 20, 2005

Related U.S. Application Data

(63) Continuation of application No. PCT/JP03/06147, filed on May 16, 2003.

(51) Int. Cl.
*G01R 31/08* (2006.01)
*H04L 12/28* (2006.01)

(52) U.S. Cl. .................................. 370/238; 370/400
(58) Field of Classification Search ................ None
See application file for complete search history.

(56) References Cited

U.S. PATENT DOCUMENTS

| 6,876,817 | B2  |   | 4/2005 | Wada et al. |   |
|---|---|---|---|---|---|
| 7,035,226 | B2 | * | 4/2006 | Enoki et al. | 370/254 |
| 7,042,882 | B2 | * | 5/2006 | Kano et al. | 370/395.3 |
| 7,046,669 | B1 | * | 5/2006 | Mauger et al. | 370/393 |
| 7,233,569 | B1 | * | 6/2007 | Swallow | 370/225 |
| 7,254,138 | B2 | * | 8/2007 | Sandstrom | 370/412 |
| 7,313,328 | B2 | * | 12/2007 | Oki et al. | 398/51 |
| 2002/0141444 | A1 | * | 10/2002 | Kano et al. | 370/468 |
| 2002/0186689 | A1 |   | 12/2002 | Miyabe |   |
| 2002/0194368 | A1 |   | 12/2002 | Kon et al. |   |

(Continued)

FOREIGN PATENT DOCUMENTS

CA        2267033        9/1999

(Continued)

OTHER PUBLICATIONS

Yoshihiko Suemura, et al. Multi-Layer Integrated Routing Techniques Based on GMPLS. Proceedings of the 2002 Communications Society Conference of IEICE, Sep. 10-13, 2002.

*Primary Examiner*—Hong Cho
*Assistant Examiner*—Eunsook Choi
(74) *Attorney, Agent, or Firm*—Katten Muchin Rosenman LLP

(57) ABSTRACT

A path setting method enabling utilization of request information from a user in a communication network having a path of a higher layer and a path of a lower layer formed in a hierarchy and performing communication between one communication apparatus and another communication apparatus for which a path is set by repeating through another communication apparatus. This method has a step of judging a possibility of reaching the destination communication apparatus in the higher layer, judged in the communication apparatus existing in the middle of the path, a step of transmitting a lower layer path setting request message obtained by further adding route designating information and bandwidth information in a higher layer path setting request message when it is judged there is no possibility of reaching the apparatus, and a step of notifying the transmitted lower layer path setting request message to each communication apparatus on the route reaching the destination communication apparatus.

8 Claims, 32 Drawing Sheets

U.S. PATENT DOCUMENTS

| | | | |
|---|---|---|---|
| 2003/0189898 A1* | 10/2003 | Frick et al. | 370/227 |
| 2003/0193901 A1* | 10/2003 | Ishibashi | 370/252 |
| 2004/0114595 A1 | 6/2004 | Doukai | 370/389 |
| 2004/0247315 A1* | 12/2004 | Ozugur et al. | 398/45 |

FOREIGN PATENT DOCUMENTS

| | | |
|---|---|---|
| JP | 11-284664 | 10/1999 |
| JP | 2001-358771 | 12/2001 |
| JP | 2002-084228 | 3/2002 |
| JP | 2002-084280 | 3/2002 |
| JP | 2002-208946 | 7/2002 |
| JP | 2002-271373 | 9/2002 |
| JP | 2002-300194 | 10/2002 |
| JP | 2002-344496 | 11/2002 |
| JP | 2003-209564 | 7/2003 |

* cited by examiner

PATH SETTING METHOD AND COMMUNICATION APPARATUS IN COMMUNICATION NETWORK PERFORMING COMMUNICATIONS THROUGH A PLURALITY OF LAYERS

CROSS REFERENCE TO RELATED APPLICATION

The present application is a continuation application of International application No. PCT/JP03/06147, filed on May 16, 2003, the contents being incorporated herein by reference.

TECHNICAL FIELD

The present invention relates to a path setting method and a communication apparatus in a communication network having a plurality of layers and performing communication between communication apparatuses through a path set by for example a signaling mechanism.

Here, "a plurality of layers" means the layers in the case where there are a plurality of types of layers for setting a path reaching a reception side communication apparatus for receiving information of a transmission side communication apparatus transmitting information. Giving an example, there are currently a layer for setting a path by switching packets, that is, a packet path layer, a layer for setting a path by switching the wavelength of light, that is, a wavelength path layer, and so on. Accordingly, the path set in the former case will be referred to as a "packet path", and the path set in the latter case will be referred to as a "wavelength path".

BACKGROUND ART

In recent years, communication networks utilizing multi protocol label switching (mpls) have been rapidly spreading is use. This MPLS first requests a label for each path until the destination communication apparatus to which a packet is to be transmitted is reached, determines an allocated label in response to the request, and realizes the communication with the above described destination communication apparatus according to routing based on the label.

Further, recent there has been a tendency to extend the MPLS to not only the packet layer, but also layers other than the packet layer to realize the above described communication. For this purpose, a communication network enabling application of the signaling techniques in the already existing MPLS to not only the original packet layer, but also layers other than the packet layer, for example, the wavelength layer (or time slot layer etc.) as it is has been proposed. Note that the prior art mentioned here will be explained in detail later by referring to FIG. 25 to FIG. 34.

Note that as known art related to the present invention, there are the following Patent DocuMENT1 to 3.

Patent Document 1: Japanese Unexamined Patent Publication (Kokai) No. 2002-271373
Patent Document 2: Japanese Unexamined Patent Publication (Kokai) No. 2002-84228
Patent Document 3: Japanese Unexamined Patent Publication (Kokai) No. 2001-358771

However, none of these known art suggests the technical idea of the present invention.

When looking at the above Patent Document 1, the plane covered by the Present Document 1 is completely different from the plane covered by the present invention. Namely, a MPLS network can be logically considered divided into a forwarding plane for actually forwarding data packets and a control plane for setting or controlling a label switching path (LSP). Between them, the Present Document 1 relates to the forwarding plane, particularly its input end. Contrary to this, the present invention relates to the control plane, so the two are completely different.

Next, when looking at the above Patent Document 2, the Present Document 2 relates to art utilizing a coding space that combines a wavelength axis and a time axis called an optical code" in order to provide a larger space as the space of an identifier for a burst in a network performing optical bust switching. Contrary to this, the present invention relates to the setting of a path and the routing of information, therefore, so the two are fundamentally different in this point.

Further, when looking at the above Patent Document 3, the Present Document 3 relates to a method of mapping an input data program to a connection having a variety of qualities of communication. Contrary to this, the present invention relates to a method for setting a connection, that is, signaling, and calculation of a route, that is, routing, therefore the two are completely different.

In the prior art explained in detail later by referring to FIG. 25 to FIG. 34, there are two problems that will be similarly explained in detail later.

The first problem is that information concerning a request from an operator or a user sometimes cannot be utilized when calculating the route of a path.

For this reason, the route of a path of the wavelength layer suitable for accommodating the path of the packet layer, for example, the route of a path of the wavelength layer able to keep the number of wavelengths which newly become necessary to the minimum cannot be selected.

The second problem is that a path setting request message and a path setting acknowledgement message responding to this must be transferred a plurality of times between the communication apparatuses in order to set paths of a plurality of layers, for example, the packet layer and the wavelength layer.

For this reason, the "procedure for path setting" in each communication apparatus becomes complex.

DISCLOSURE OF THE INVENTION

In consideration of the above problems, an object of the present invention is to provide a path setting method and a communication apparatus enabling utilization of information concerning a request from an operator or a user at the time of calculation of the route of a path and enabling a decrease of the number of times of transfer of the path setting request message and the path setting acknowledgement message between the communication apparatuses.

In the present invention, the following path setting methods are provided in order to solve the above two problems.

(1) First, the first problem is that, as previously mentioned, there is a case where information concerning a request from an operator or user cannot be utilized when calculating the route of a path.

As the path setting method for solving this first problem, the present invention proposes the following two methods (1-1) and (1-2).

(1-1) First Method

When it is necessary, in the middle of the route of a path of a lower layer, to calculate the route of a path by a first communication apparatus, the route, which is the closest route to the first communication apparatus, up to the second communication apparatus is determined, which second communication apparatus is able to terminate that path.

If doing this, the path setting request message of a higher layer reaches this second communication apparatus, therefore, here, the information concerning the information from the operator or the user can be utilized.

(1-2) Second Method

Route designating information and bandwidth information of the path of the higher layer tunneled by the path of the lower layer are accommodated in the path setting request message of the lower layer.

By this, when it is necessary to calculate the route of a path of a communication apparatus in a communication apparatus of the lower layer existing in the middle of the path of the lower layer, this communication apparatus can utilize the route designating information and the bandwidth information of the path of the higher layer described above.

(2) Next, when looking at the second problem, this problem is that the path setting request message and the path setting acknowledgement message responding to this must be transferred a plurality of times between the communication apparatuses in order to set paths of a plurality of layers, for example, the packet layer and the wavelength layer as previously mentioned. The second method for solving this is as follows.

Namely, it is the method of including all of the path setting request messages of the higher layer in a path setting request message of the lower layer.

By this, when it is necessary in a communication apparatus existing in the middle of the route of a path of the lower layer to calculate the route of this path, the path setting information included in the path setting request message of the higher layer can be utilized. Accordingly, the total number of messages to be transferred can be decreased.

By employing any of the above methods (1-1), (1-2), and (2), it becomes possible to utilize the information concerning a request from an operator or user in a communication apparatus for calculating the route of a path in a network that has a plurality of layers and must calculate the route of a path in a dispersed manner as covered by the present invention.

For this reason, it becomes possible to select a more optimal route for responding to a request from an operator or user. As a result, it becomes possible to further efficiently utilize network resources. Further, it becomes possible to set a plurality of paths by a smaller number of messages.

BEST MODE FOR WORKING THE INVENTION

In order to facilitate understanding of the present invention, first of all the prior art will be explained by referring to FIG. 25 to FIG. 34.

Note that the communication network on which the present invention is based is a communication network setting a path by a signaling mechanism and further setting (tunneling) another path in the path by the signaling to thereby form a hierarchy of these paths as explained above.

The technology of setting a path for a packet communication apparatus by utilizing a signaling protocol such as the Resource Reservation Protocol-Traffic Engineering (RSVP-TE) or Constraint-Based Route-Label Distribution Protocol (CR-LDP) was developed as the technology for setting a label switch path (LSP) in Multi Protocol Label Switching (MPLS).

In a network using such a technique, the label distributed by using the RSVP-TE or CR-LDP is transmitted explicitly added to the packet to be transmitted. The state of this path setting and the state of the communication after the path setting are shown in FIG. 25 and FIG. 26.

Figure 25:
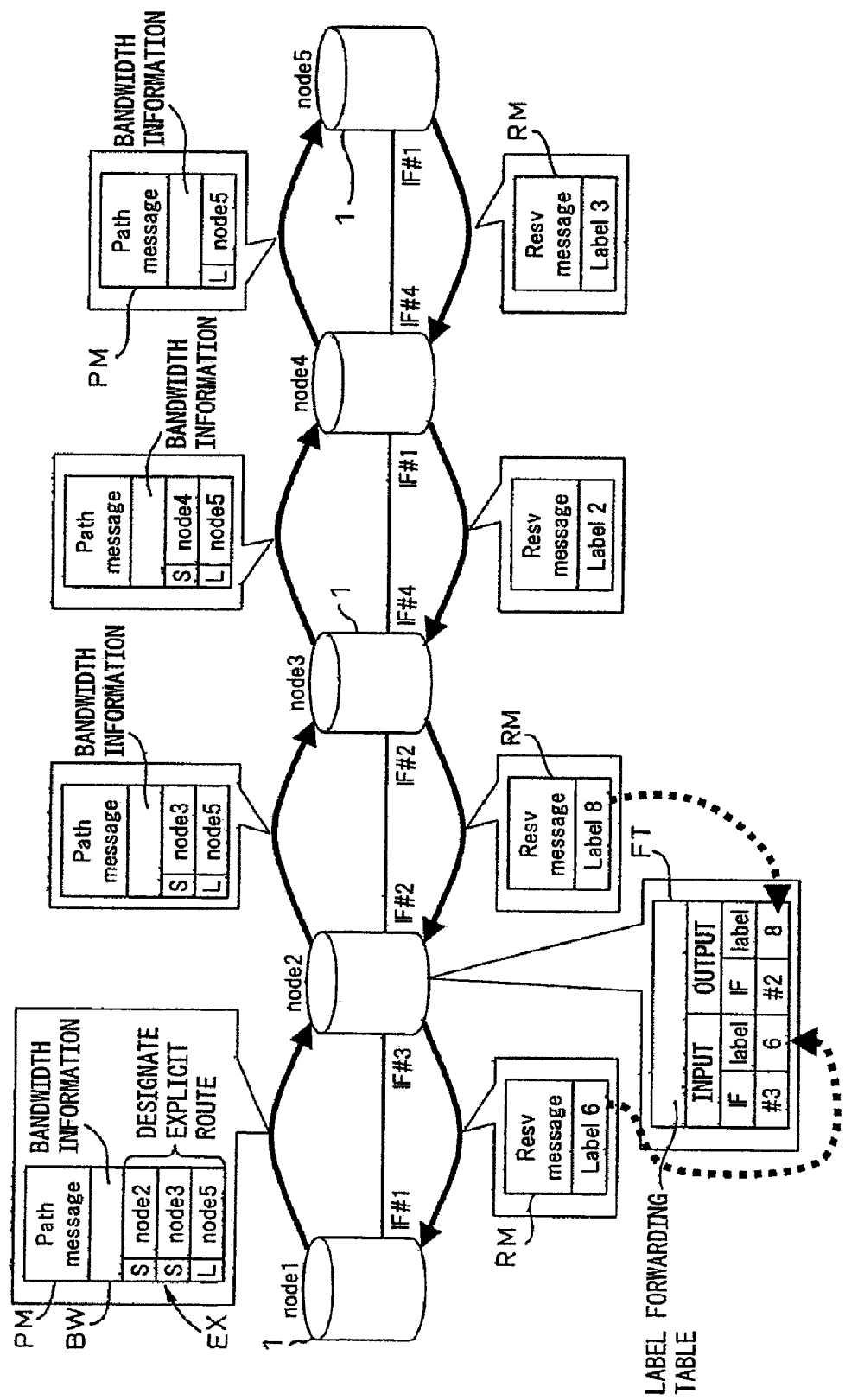
FIG. 25 is a view of an example of a path setting operation using RSVP-TE.
Figure 26:
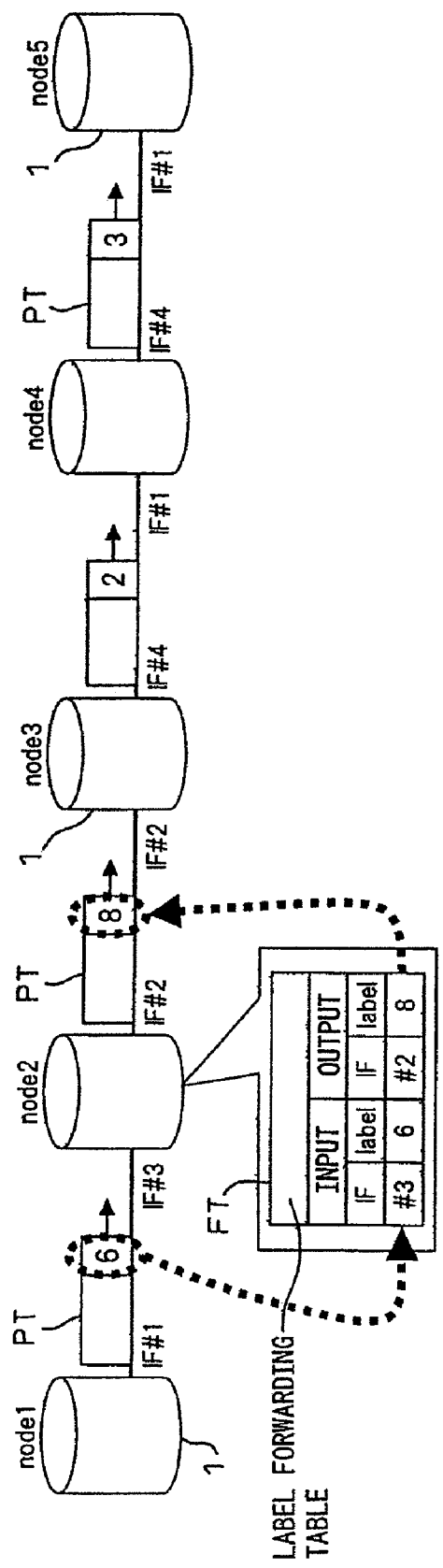
FIG. 26 is a view of an example of a packet transmitted on the path established by the path setting operation of FIG. 25.

FIG. 25 is a view of an example of a path setting operation using the RSVP-TE; and FIG. 26 is a view of an example of a packet transmitted on a path established by the path setting operation of FIG. 25.

Note that, in the example of FIG. 25, use is made of the message name of RSVP-TE, but the same is accomplished even when CR-LDP is used.

A path setting request message PM for requesting a path setting operation can include a route through which the path must pass as explicit route designating information EX and a bandwidth requested for the path as a requested bandwidth information BW.

There are many types of methods as the method for the explicit route designation. They can be roughly classified to two designations of a strict (S) designation and a loose (L) designation. In FIG. 25, these are indicated by "S" and "L". A communication apparatus 1 receiving the strict designation "S" must select the designated communication apparatus 1 as the next hop. Note that communication apparatuses 1 are indicated differentiated as the node 1, node 2, . . . in FIG. 25. Further, in FIG. 25, the node 2 transmits the message PM to the node 3 since node 3 is designated as the strict route designation.

Contrary to this, a communication apparatus 1 receiving the loose designation "L" can include another communication apparatus 1 which was not designated in the middle of the route toward the designated communication apparatus 1. In FIG. 25, node 3 can include node 4 in the middle of the route thereof since node 5 is designated as the loose route designation "L". In this case, in that node 3, it is decided to include the node 4 in the middle by calculating the route from node 3 per se to node 5.

In this way, in the signaling protocol, it is permitted to dispersely calculate the route of the path in the communication apparatuses 1 in the middle of a path.

A path setting acknowledgement message (indicated as Resv message RM), as shown in FIG. 25, stores values of labels used in the links (Label "3", Label "2", Label "8", . . . ). Each communication apparatus 1 generates a label forwarding table FT based on this label information.

When the path set by the signaling shown in FIG. 25 is actually utilized, the packet PT is forwarded according to the table FT (shown for only one node 2) shown in FIG. 26. Note that, "IF" in the figure represents an interface.

In recent years, in order to realize forwarding control integrating a transmission network and a router network, it is proposed to also apply this MPLS technology to the setting of a time division multiplex (TDM) path or a wavelength path. In order to achieve this object, the concept of the label described above is further extended, and the concept of incorporating the time slot, wavelength, etc. into the generalized label is introduced. Due to this, it becomes possible to set also the TDM path, wavelength path, etc. by using the signaling protocol based on RSVP-TE and CR-LDP. The state of this path setting is shown in FIG. 27.

Figure 27:
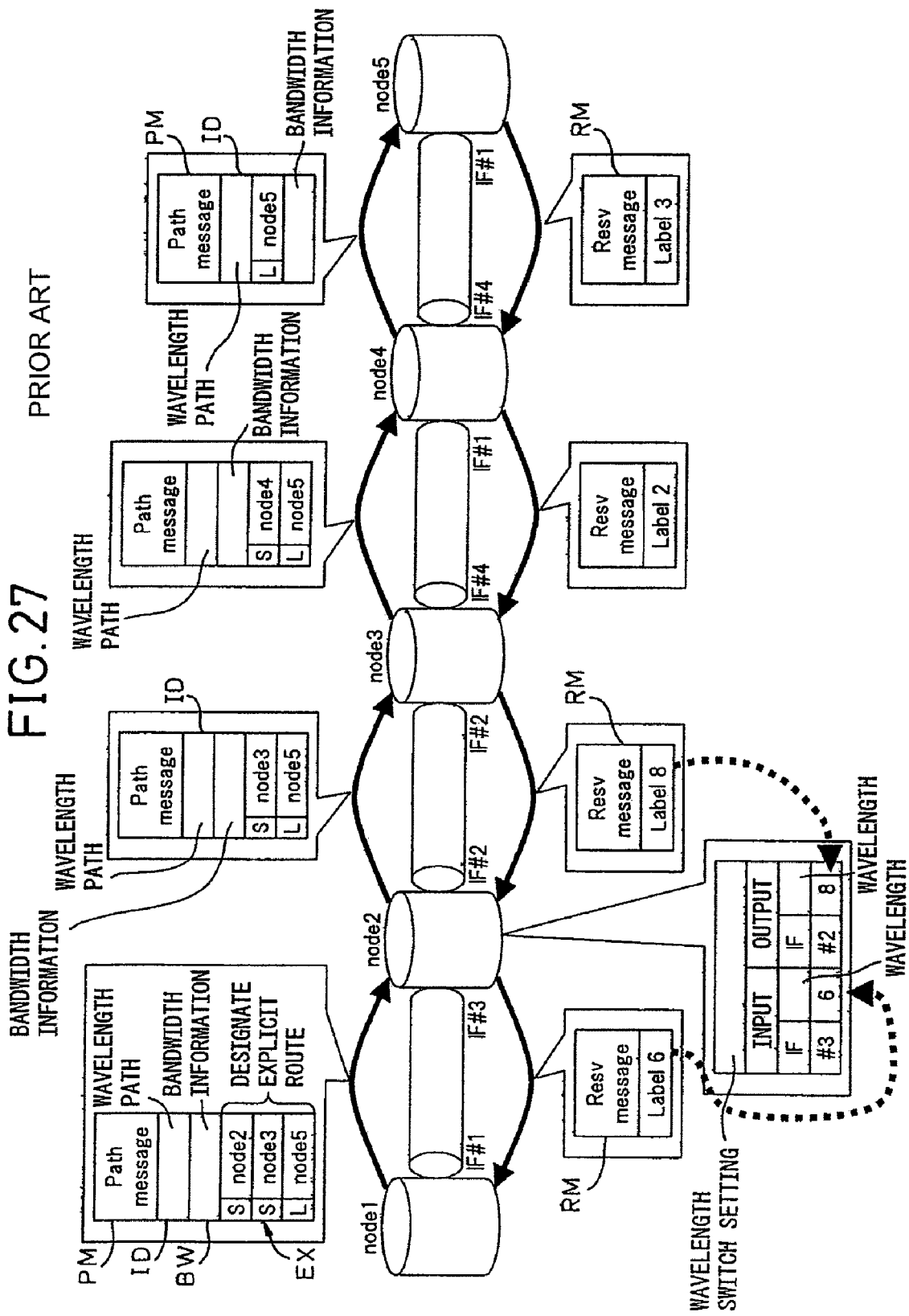
FIG. 27 is a view of an example of a wavelength path setting operation using RSUP-TE based GMPLS signaling.

FIG. 27 is a view of an example of a wavelength path setting operation using RSVP-TE based GMPLS signaling.

When comparing the case of FIG. 27 and the case of FIG. 25 described above, in the case of FIG. 27, since it was extended so that G (generalized) MPLS could be applied to various types of layers, an identifier ID for designating the layer of a path is added.

Figure 28:
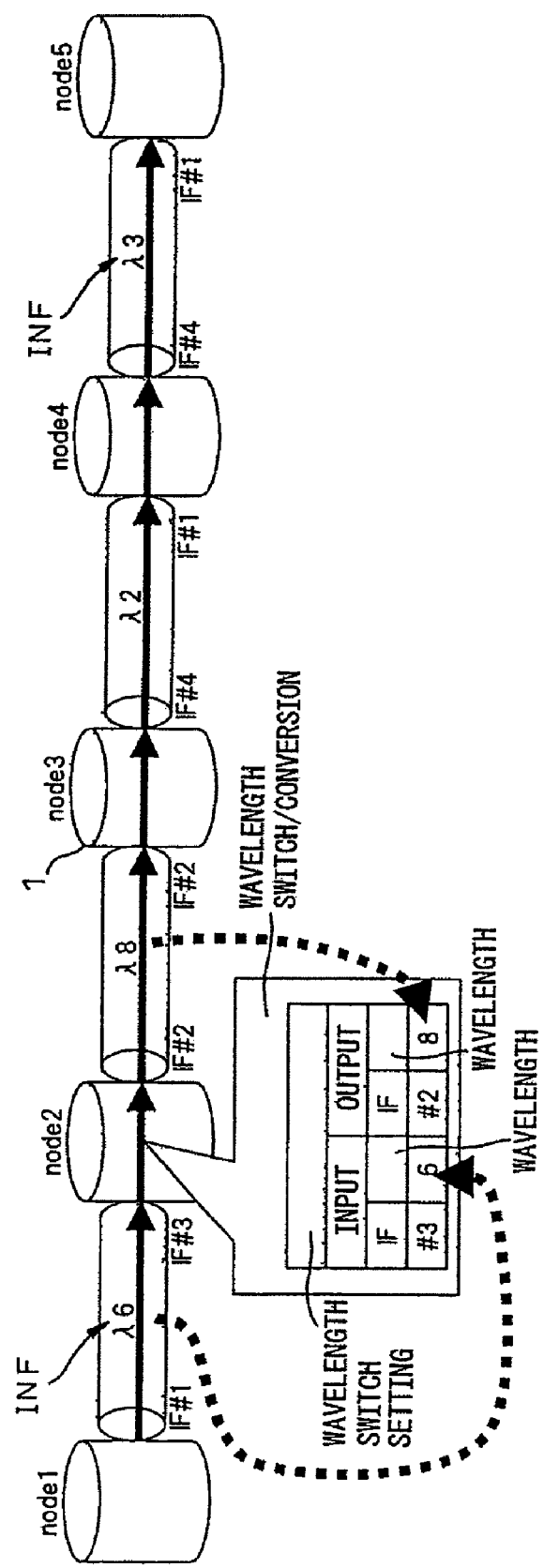
FIG. 28 is a view of an example of information forwarded on a path established by the path setting operation of FIG. 27.

FIG. 28 is a view of an example of information forwarded on a path established by the path setting operation of FIG. 27.

Note that, in the case of a wavelength path set by this signaling (the same also for the case of the TDM path), unlike the case of the packet path explained before, only the information INF is transmitted by using the designated wavelength (or time slot). The explicitly generalized label is not added to the information to be transmitted.

The setting of a path utilizing the above mentioned signaling protocol means processing by dispersing the path setting procedure, therefore it has been considered to be excellent also in view of scalability. At the present, the Multi Protocol Label Switching (MPLS) Working Group of the Internet Engineering Task Force (IETF) is working on standardization of such signaling protocol.

Next, a network for setting a path by signaling for a plurality of transmission mechanisms will be explained.

Figure 29:
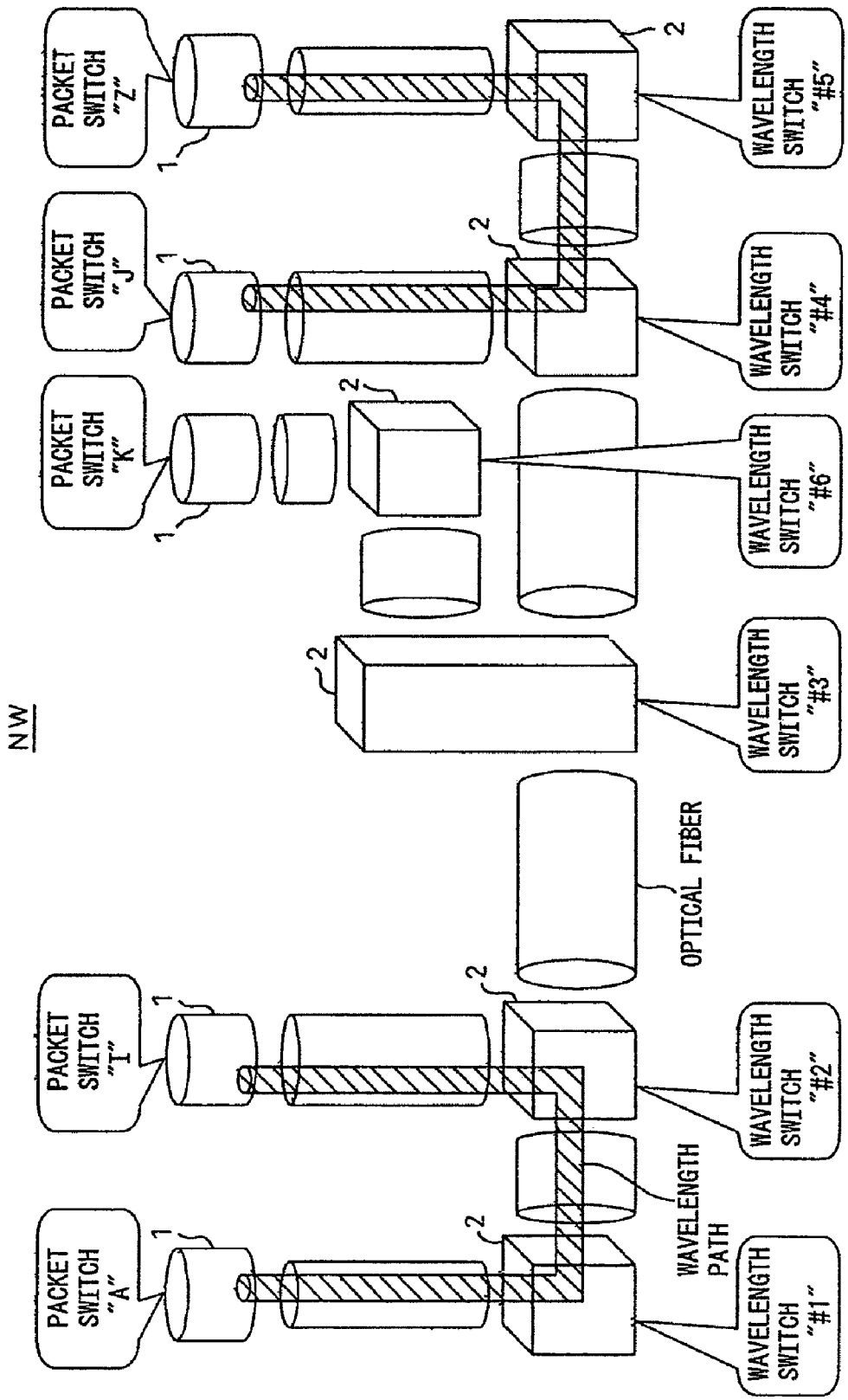
FIG. 29 is a view of an example of a network having a plurality of layers and setting a path by signaling.
Figure 30:
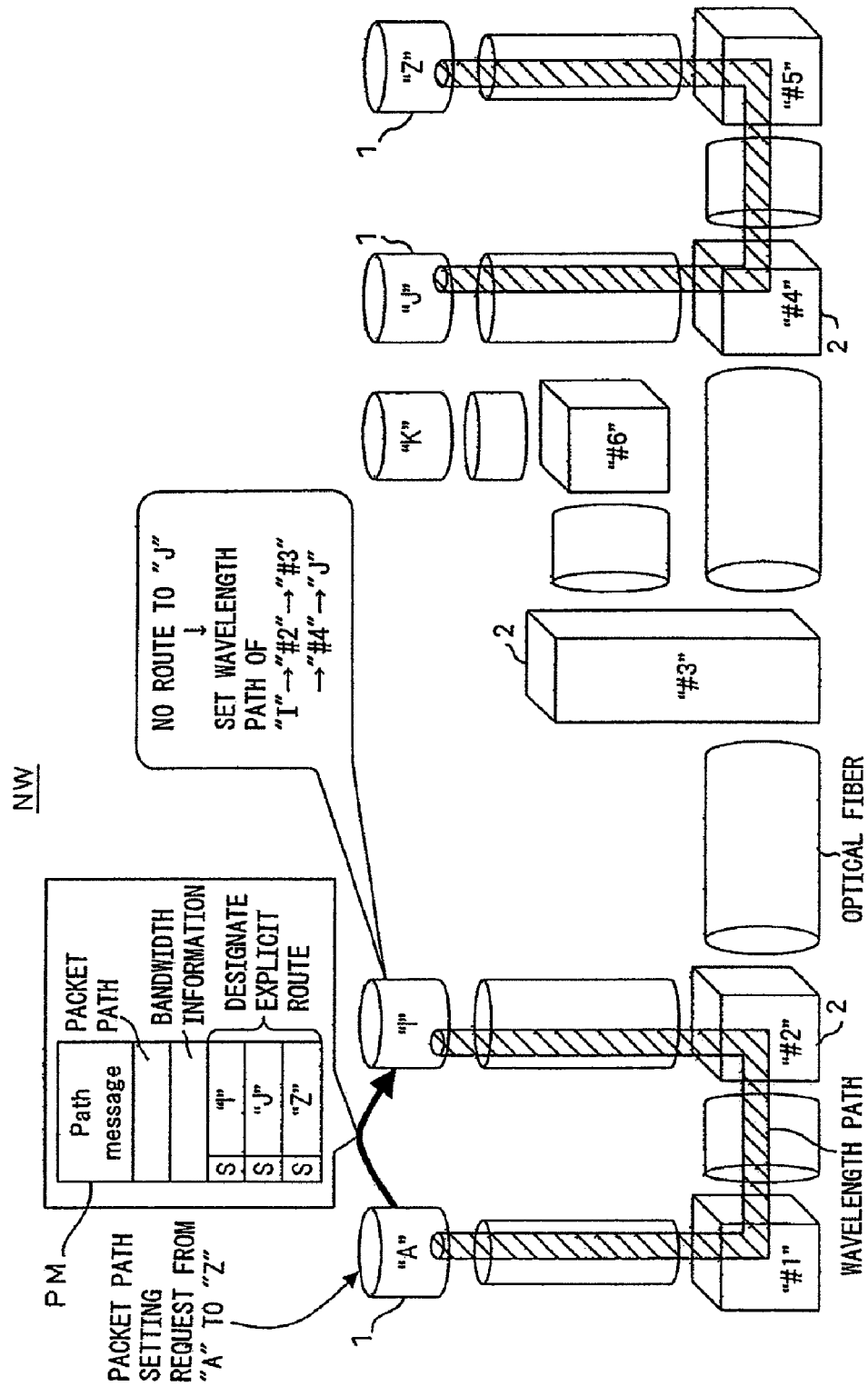
FIG. 30 is a view illustrating the procedure for setting a path from "A" to "Z" in the network of FIG. 29 (first)
Figure 31:
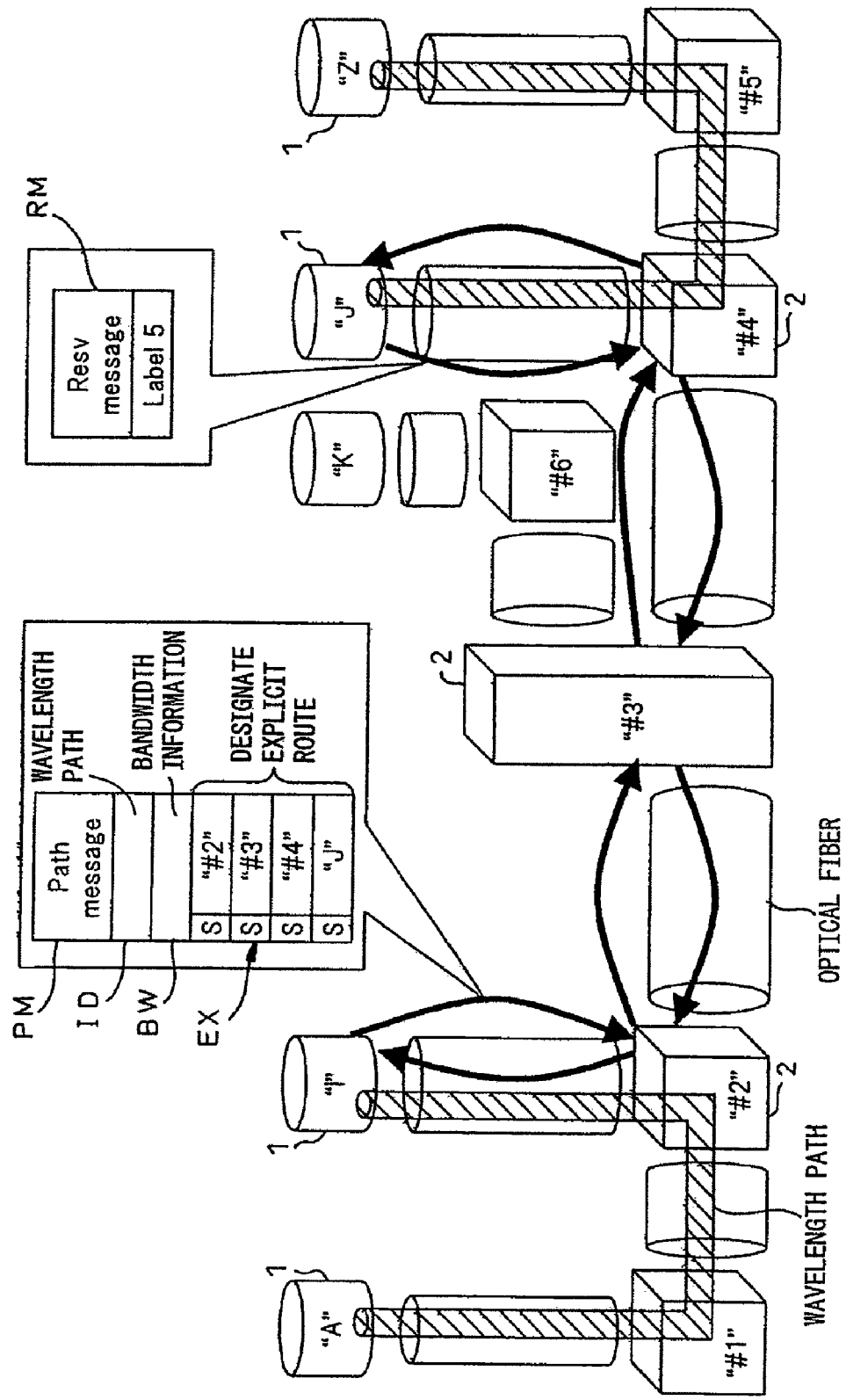
FIG. 31 is a view illustrating the procedure for setting a path from "A" to "Z" in the network of FIG. 29 (second)
Figure 32:
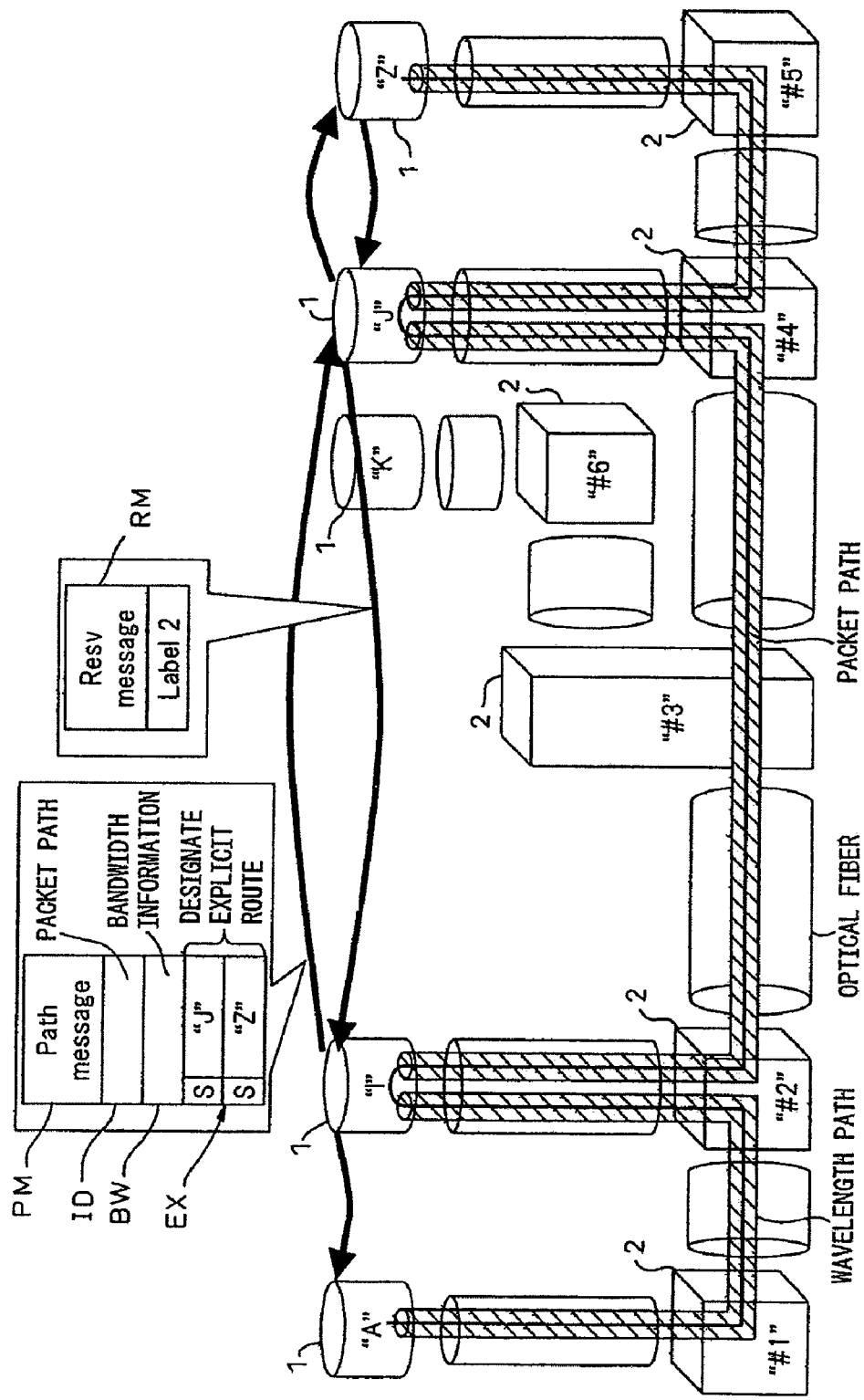
FIG. 32 is a view illustrating the procedure for setting a path from "A" to "Z" in the network of FIG. 29 (third)

FIG. 29 is a view of an example of a network having a plurality of layers and setting a path by signaling. Further, FIG. 30 is a view illustrating the procedure of setting a path from "A" to "Z" in the network of FIG. 29 (first);

FIG. 31 is a view illustrating the procedure of setting a path from "A" to "Z" in the network of FIG. 29 (second); and FIG. 32 is a view illustrating the procedure of setting a path from "A" to "Z" in the network of FIG. 29 (third).

Referring to FIG. 29 first, in this example, a network NW is configured by two types of communication apparatuses 1 and 2, that is, a packet switch type and a wavelength switch type, and has two transmission mechanisms, that is, for packet switching in the packet layer and wavelength switching in the wavelength layer.

In this case, the path of the packet layer is tunneled in the path of the wavelength layer. That is, the path of the packet layer and the path of the wavelength layer are formed in a hierarchy. The paths of these two layers are set by the GMPLS signaling based on the RSVP-TE or CR-LDP. Note that, in the following explanation, the communication apparatus 1 will be also referred to as a "packet switch", and the communication apparatus 2 will be also referred to as a "wavelength switch".

Further, assuming that the communication apparatuses 1 and 2 in the network NW hold information of all topologies and resources in the network NW sufficient for calculating the route for all path setting requests, these topology information and resource information are obtained by operating for example dispersed routing protocol.

In such a network NW, assume that a packet path from the packet switch "A" toward the packet switch "Z" is requested by an operator or user of the network (hereinafter referred to as the operator etc.) Then, the packet switch "A" holds information sufficient for calculating the path for this request, therefore, for example, it can calculate a route such as "A"→"I" (strict)→"J" (strict)→"Z" (strict) as the route of the path of the packet layer so that the number of the wavelengths which newly become necessary for accommodating this path setting request is minimized. This is because, between "A" and "I" and between "J" and "Z", wavelength paths having sufficient bandwidths have been already set at the point of time when the related request was received. By newly setting the wavelength path only between "I" and "J", the number of wavelengths which become necessary can be minimized.

The packet path setting request message PM (for example path message or LABEL REQUEST message) including the route calculated in this way is sent from the packet switch "A" to the packet switch "I". FIG. 30 shows this state.

In the packet switch "I" receiving the path setting request message PM described above, there is no transport factor via the packet layer with the packet switch "J", that is, the wavelength path is not set, therefore, the switch "I" judges to set the wavelength path with this packet switch "J" by temporarily waiting for the signaling processing for the packet switch "J". For this reason, the packet switch "I" calculates the route for the wavelength path such as "I"→"#2"→"#3"→"#4"→"J" and transmits a wavelength path setting request message including this route as a strict explicit route. FIG. 31 shows this state. Thus, when a wavelength path in response to the above path setting request is set, the signaling processing of the packet path which was temporarily kept waiting at the packet switch "I" is subsequently carried out, and finally the packet path is set. FIG. 32 shows this state.

Next, the already explained problems (first problem and second problem) to be solved by the present invention will be explained.

In the example explained in the prior art explained before, there are communication apparatuses calculating routes at two portions (packet switches "A" and "I"). The request from the operator etc. of the network NW is transferred to these apparatuses before the route calculation, therefore a route suited to the request (for example a request that minimizes the number of wavelengths which newly become necessary) can be calculated.

However, since these communication apparatuses can only utilize limited information of the topology and resources, when it is necessary to dispersely perform the route calculation of a path and the network has a plurality of layers, sometimes information concerning a request from an operator etc. of the network cannot be utilized at the time of route calculation. In such a case, how much of the information of the topology and resources can be utilized by each communication apparatus depends upon the mechanism of the routing and the routing protocol to be utilized.

For example, in the case where a dispersed routing protocol is used and where the network is divided into a plurality of routing areas and domains in order to secure scalability, the communication apparatuses cannot utilize the information of the topology and resources of the entire network. Such an example is shown in FIG. 33.

Figure 33:
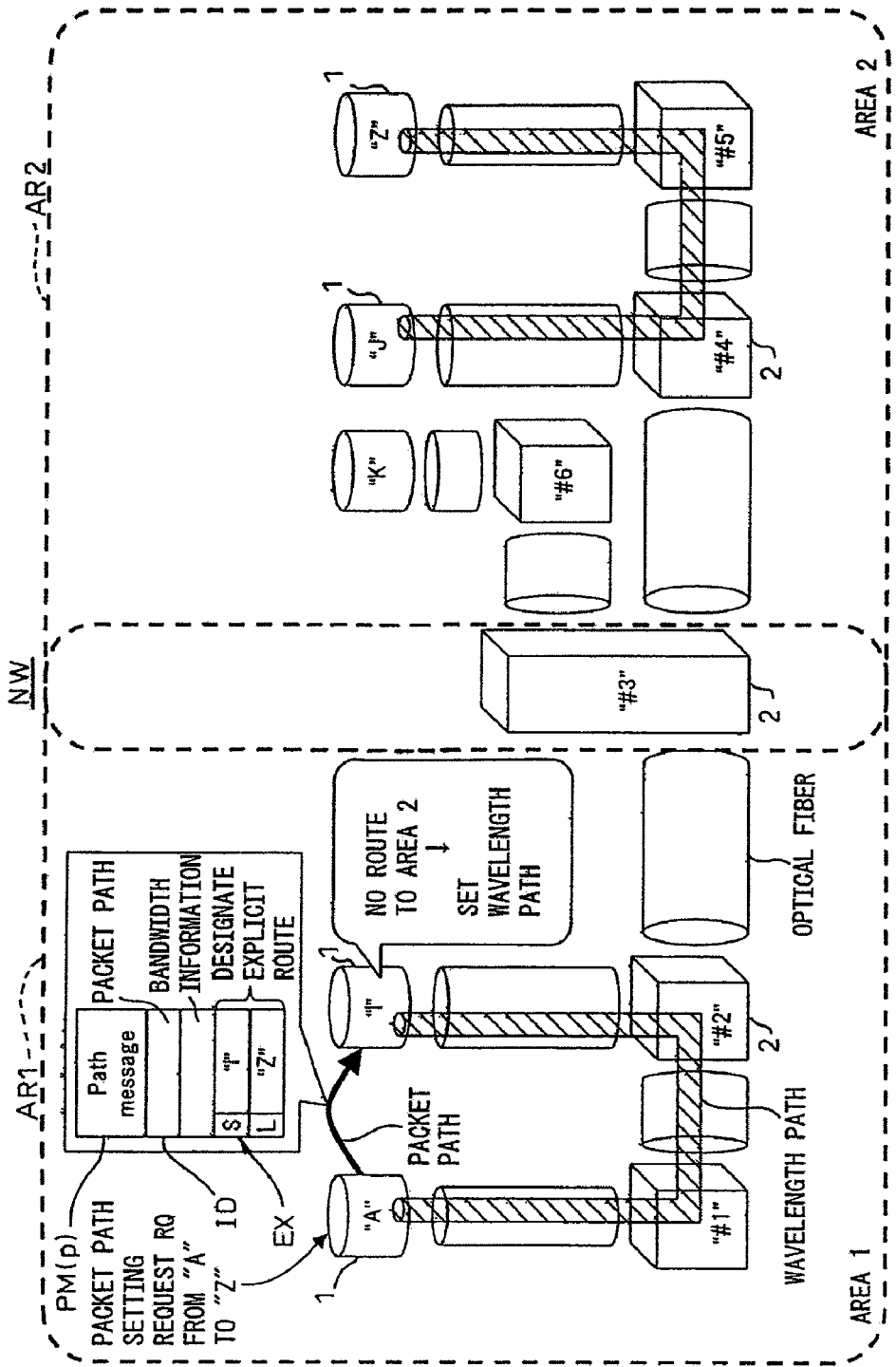
FIG. 33 is a view for explaining a first problem to be solved by the present invention (first)
Figure 34:
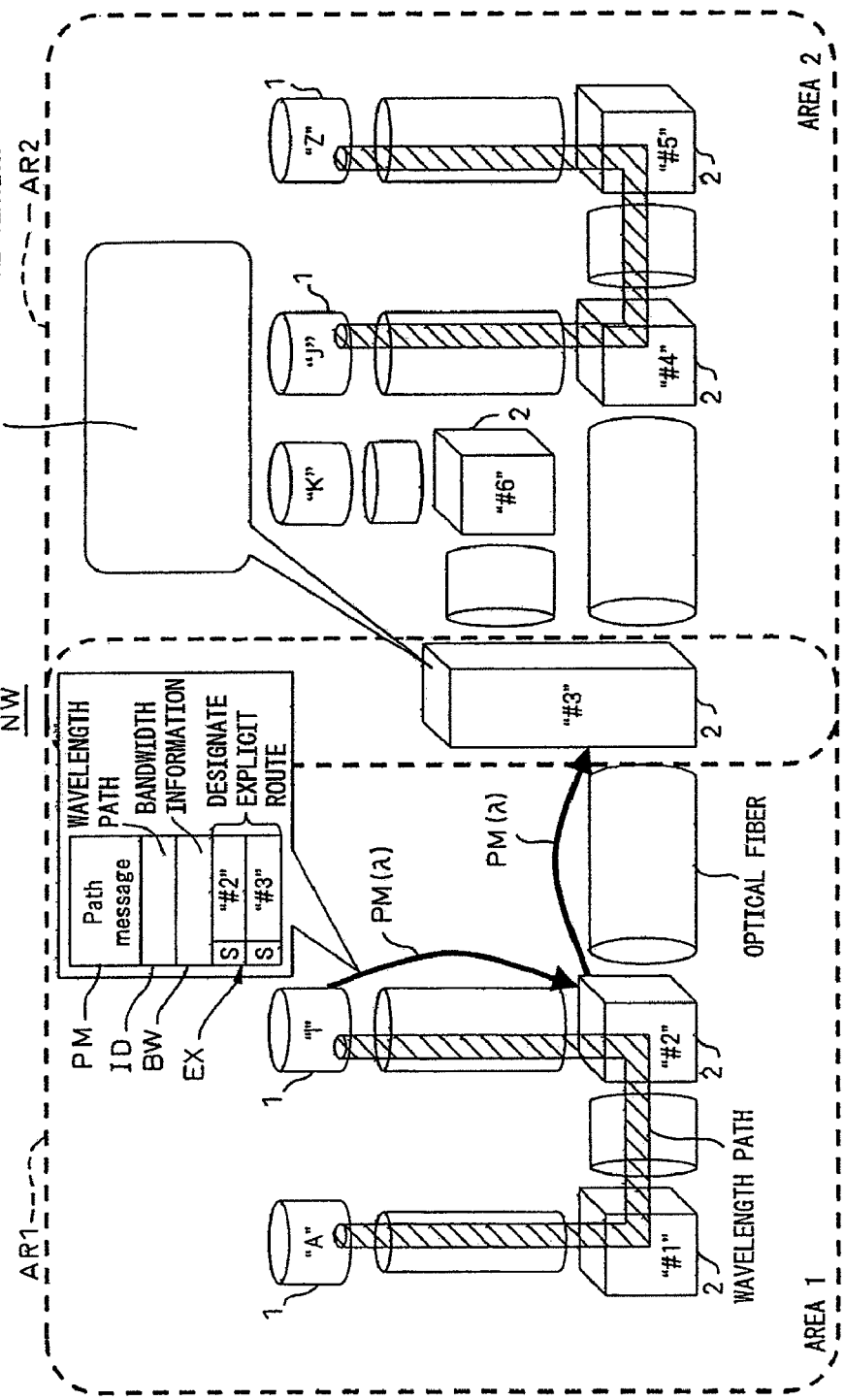
FIG. 34 is a view for explaining a first problem to be solved by the present invention (second).

FIG. 33 is a view for explaining the first problem to be solved by the present invention (first); and FIG. 34 is the same view (second). When routing is divided into a plurality of areas (for example AR1 and AR2), the communication apparatus 1 in a certain area (for example AR1) knows the information of the topology and resource in that area, but concerning the communication apparatus of another area (for example AR2) and that area, it can learn only information of the extent of through which area boundary communication apparatus (for example communication apparatus #3) it can reach the communication apparatus of another area.

For this reason, in the packet switch "A" in AR1, when receiving the path setting request RQ up to the packet switch "Z" in AR2 from the operator etc., only the packet switch "I" in the area AR1 and closer to the packet switch "Z" and "Z" designated by the operator etc. are designated as the route (EX in the present figure) and the path setting request message PM is transmitted toward the packet switch "I". However, the packet switch "I" receives the information of this path setting request message PM, but does not have a method of reaching the area AR2 on the packet layer. For this reason, the packet switch "I" attempts to send the packet path setting request message PM(p) to the communication apparatus 1 "Z" of the end point of this wavelength path by setting the wavelength path this time.

However, the packet switch "I" can only utilize the information of the topology and resources in the area AR1, therefore designates the route up to the communication apparatus (wavelength switch "#3") located at the boundary between this area and the area AR2 and further transmits the wavelength path setting request message PM(λ) to "#3" through "#2".

The wavelength switch "#3" receiving the message PM(λ) can utilize the information of the topology and resources in the area AR2, but cannot utilize the information concerning the request from the operator etc., that is, the information requesting the setting of the packet path up to "Z". For this reason, it cannot select the route of the wavelength path suitable for accommodating this packet path, for example, a wavelength path minimizing the number of wavelengths which newly become necessary. FIG. 34 shows this state.

Further, there can be mentioned as the already mentioned second problem that, in the path setting operation of a plurality of layers, a plurality of number of times of transfer of the path setting request message PM and the path setting acknowledgement message RM is carried out, therefore the procedure of the path setting operation become troublesome (explained before).

A detailed explanation of the present invention will be given below based on the understanding of the prior art explained in detail above.

Embodiment 1

Figure 1:
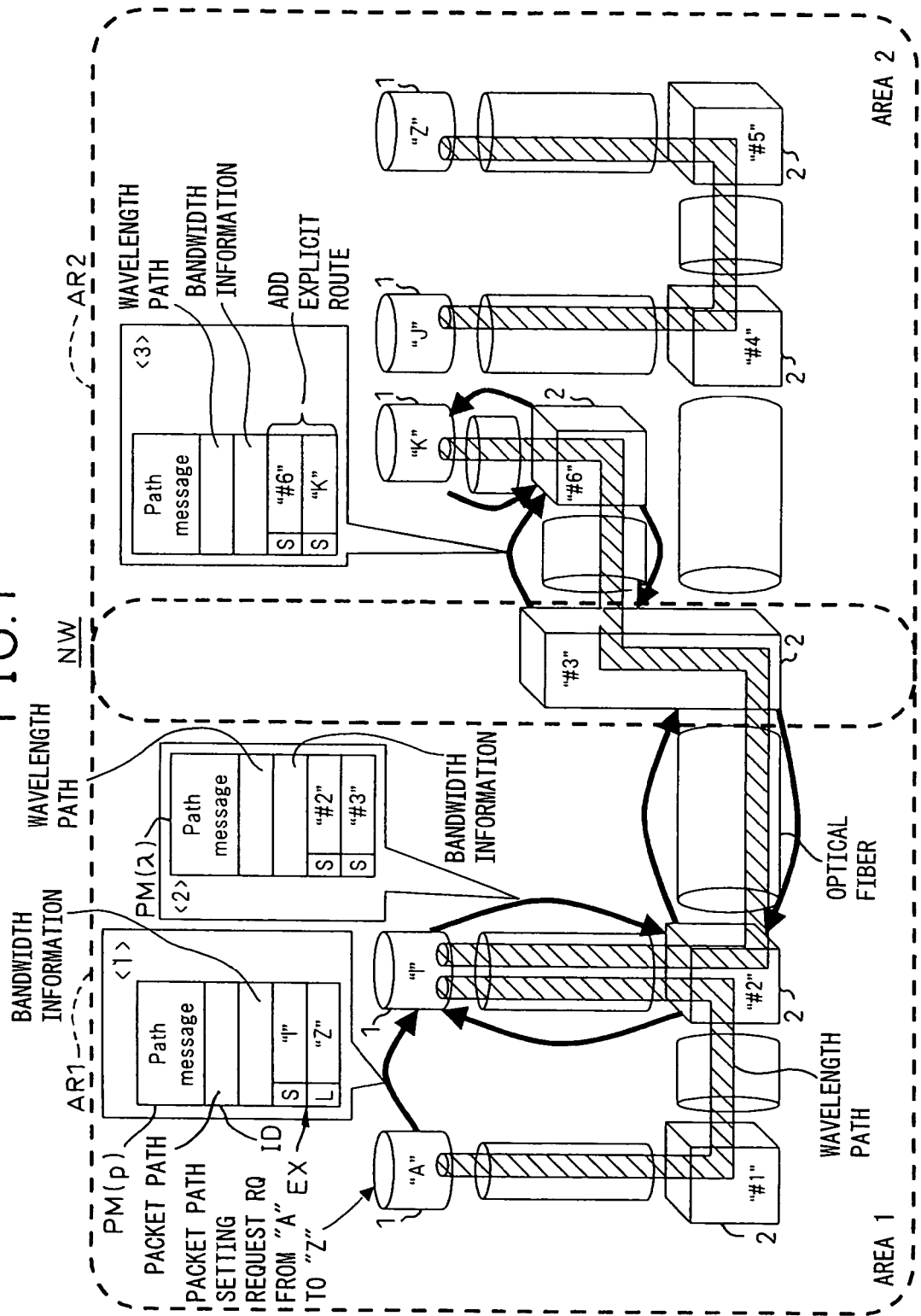
FIG. 1 is a view of Embodiment 1 based on the present invention (first)
Figure 2:
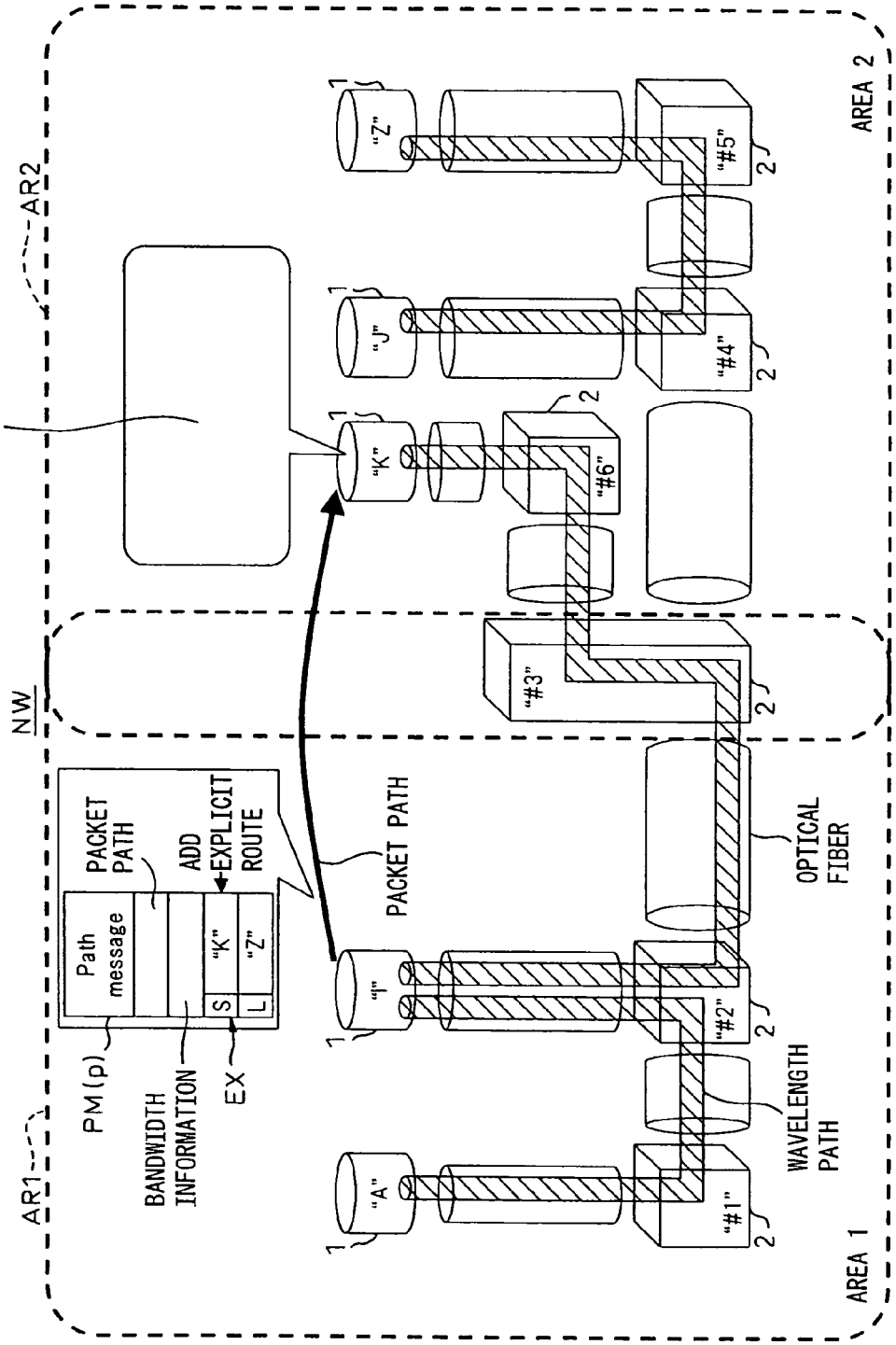
FIG. 2 is a view of Embodiment 1 based on the present invention (second)

FIG. 1 is a view of Embodiment 1 based on the present invention (first); and FIG. 2 is the same view (second).

When looking at the path setting method executed in Embodiment 1 expressed in FIG. 1 and FIG. 2, it is as follows.

First, the communication network to which the path setting method is applied is a communication network having paths of a higher layer (for example a packet layer) and paths of a lower layer (for example a wavelength layer) formed in a hierarchy and performing communication between a first communication apparatus 1 (for example "A") and a second communication apparatus 1 (for example "Z") for which path setting is carried out by repeating through at least one other communication apparatus ("I", "#1" to "#5", "K", "J", etc.) in the middle of the path. The path setting method has at least the following steps S11, S12, and S13.

Step S11: Judging the existence of the possibility of reaching the second communication apparatus 1 "Z" in the higher layer in the repeating use communication apparatuses 1 and 2 in the middle of the path after a path setting request message PM(p) requesting path setting by the higher layer from the first communication apparatus "A" to the second communication apparatus "Z" is originated.

Step S12: Setting a route up to another repeating use communication apparatus located at the closest position able to terminate the path by the lower layer when it is judged there is no possibility of reaching the apparatus in above step S11.

Step S13: Setting a route up to the second communication apparatus 1 "Z" on the basis of the path setting information (route designating and bandwidth information) included in the path setting request message PM received via the above set route in above repeating use communication apparatus ("K" in the example of the present figure).

Due to this, a path in the packet layer can be set between the communication apparatuses 1 "A" and 1 "Z".

The characterizing role when performing the path setting explained above is played by the repeating use communication apparatus 2 "#3" and the communication apparatus 1 "I".

Figure 3:
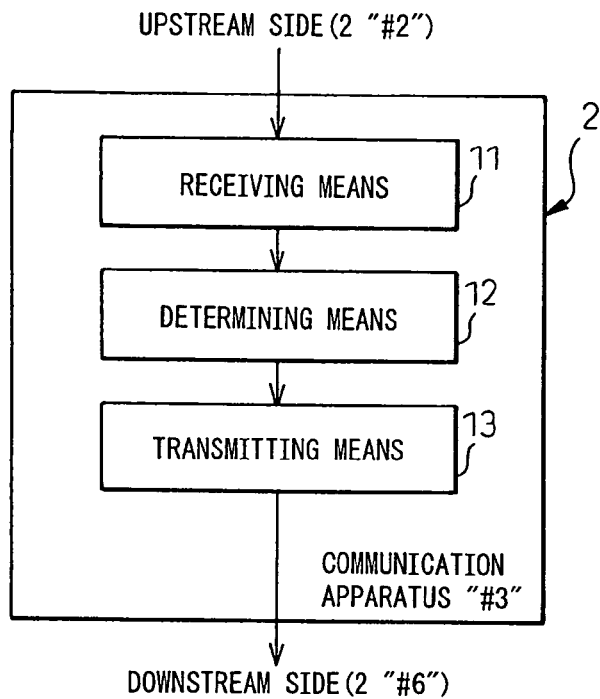
FIG. 3 is a functional block diagram of a communication apparatus 2 "#3" in Embodiment 1.
Figure 4:
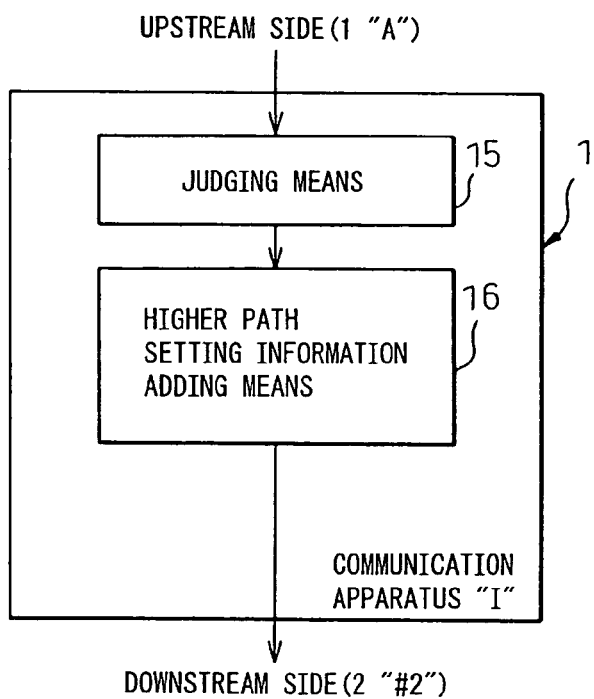
FIG. 4 is a functional block diagram of a communication apparatus 1 "I" in Embodiment 1.

FIG. 3 is a functional block diagram of the communication apparatus 2 "#3 " in Embodiment 1; and FIG. 4 is a functional block diagram of the communication apparatus 1 "I" in Embodiment 1.

Referring to FIG. 3 first, the communication apparatus 2 "#3" is provided with at least a receiving means 11, a determining means 12, and a transmitting means 13.

The receiving means 11 receives the lower layer path setting request message PM(λ) transmitted from another communication apparatus ("I") on the upstream side instead of the higher layer path setting request message PM(p) received at this communication apparatus "I".

The determining means 12 determines another communication apparatus 1 ("K" in the present figure) on the downstream side located at the closest position able to terminate the received lower layer path setting request message PM(λ).

The transmitting means 13 adds the route designating information obtained by this determination to the lower layer path setting request message PM(λ) and transmits the same. This route designating information is "#6" and "K" from the communication apparatus 2 "#3" shown in FIG. 1.

Referring to FIG. 4 next, the communication apparatus 1 "I" is provided with at least a judging means 15 and a higher path setting information adding means 16.

The judging means 15 receives the higher layer path setting request message PM(λ) from another communication apparatus ("A") on the upstream side and judges existence of the necessity of setting the path of the lower layer (wavelength path) for opening the path up to the destination of communication ("Z") designated in this received message.

The higher path setting information adding means 16 generates the related lower layer path setting request message PM(λ) and, at the same time, adds the route designating information and the bandwidth information of the path to be set on the downstream side to PM(λ) when it is judged in the judging means 15 that the necessity exists.

The above mentioned Embodiment 1 will be further explained in further detail.

The communication network NW shown in FIG. 1 and FIG. 2 has two layers of the packet layer and the wavelength layer. The packet path is formed on the wavelength path in the hierarchy.

Further, this communication network NW is divided into two areas AR1 and AR2 as shown in the figure. Each communication apparatus knows the information of the topology and resources in the area to which it belongs. However, it does not hold the information of the topology and resources out of that area and knows only through which area boundary apparatus (for example communication apparatus 2 "#3") it can reach a communication apparatus out of the area.

Here, assume that the communication apparatus 1 (hereinafter also referred to as a packet switch) "A" receives a setting request of a packet path from "A" to "Z" from an operator etc. of the network. Then, the switch "A" generates a path setting request message PM(p) for the packet layer. This message PM(p) is sent to the packet switch "I" by the designation of the explicit route EX as shown in for example <1> of FIG. 1.

In this packet switch "I", the wavelength path switches #2 and #3 do not have a packet path terminating capability, therefore, it is judged that there is no transport factor in the packet layer up to the "Z", and the processing in "I" of the packet path setting request message PM(p) is temporarily kept waiting. Then, it determines to set the wavelength path. For example, it sends the wavelength path setting message PM(λ) as shown in <2> of FIG. 1. This sent wavelength path setting message PM(λ) is first processed at "#2" and further reaches "#3".

In the communication apparatus (wavelength switch) "#3", the explicit route ("#3" in <2> of FIG. 1) in the arrived wavelength path setting request message PM(λ) is eliminated, so it is confirmed if it can become a terminating point of the wavelength path requested from the communication apparatus "I". The communication apparatus 2 "#3" is a wavelength switch apparatus and does not have the capability of terminating the wavelength path as described above, therefore, here, the apparatus #3 calculates the route up to the communication apparatus located at the closest position able to terminate the wavelength path ("K" in the example of the present figure). Then, it adds the route designating information based on the calculation result to the wavelength path setting request message PM(λ) and sends PM(λ) to the communication apparatus 2 "#6" (refer to <3> of FIG. 1).

Below, the message processing is carried out in the same way as the prior art, and the wavelength path is set between the communication apparatuses "I" and "K".

Then, as shown in FIG. 2, the above explained packet path setting request message P(λ) for which processing had been kept waiting in the communication apparatus 1 "I" is sent to the apparatus "K". This message P(λ) includes information setting packet switch up to "Z" concerning the request from the operator etc., therefore the apparatus "K" can calculate the further route based on this information and the information of the topology and resources of the area AR2.

Embodiment 2

Figure 5:
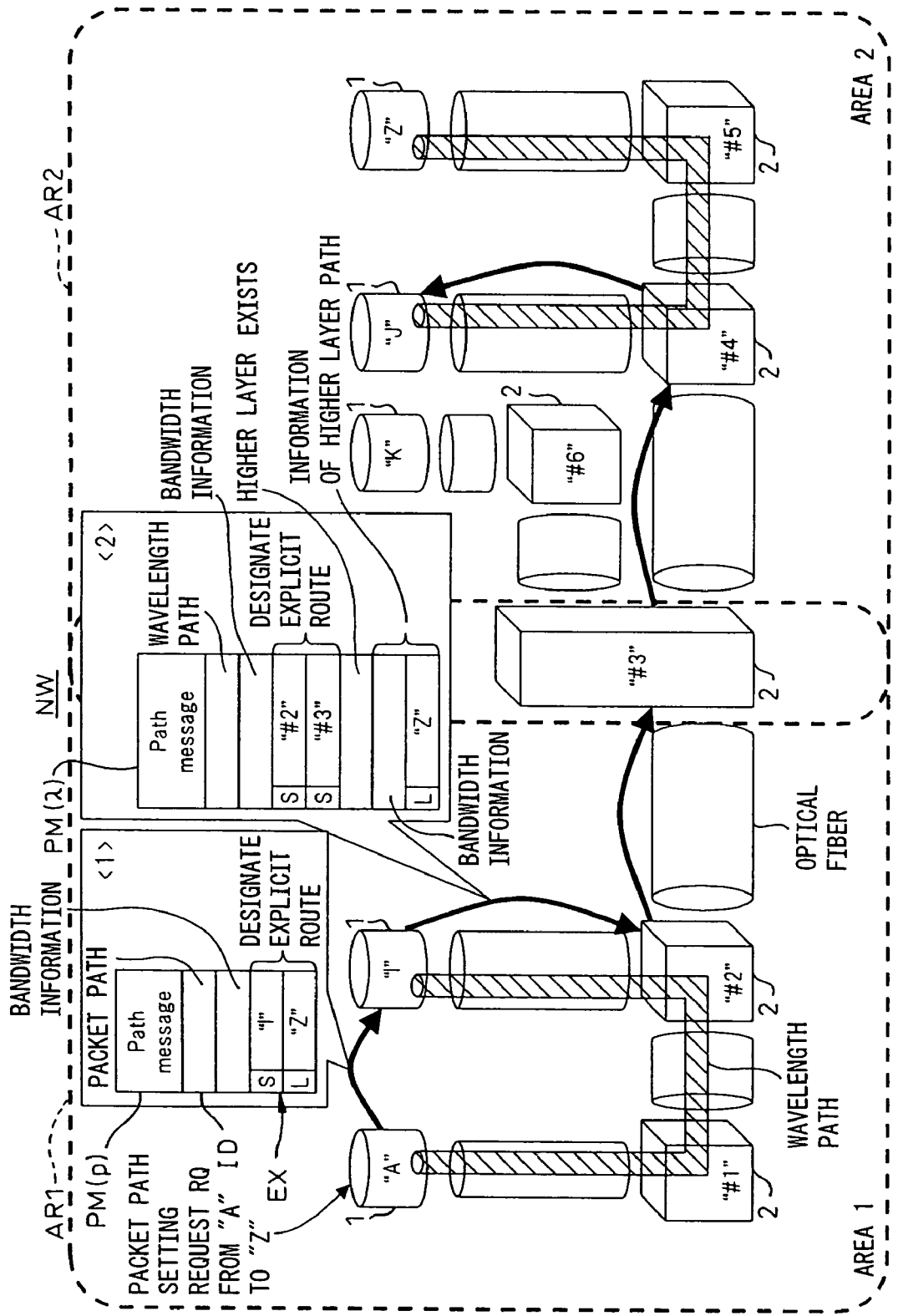
FIG. 5 is a view of Embodiment 2 based on the present invention (first)

FIG. 5 is a view of Embodiment 2 based on the present invention (first); and

Figure 6:
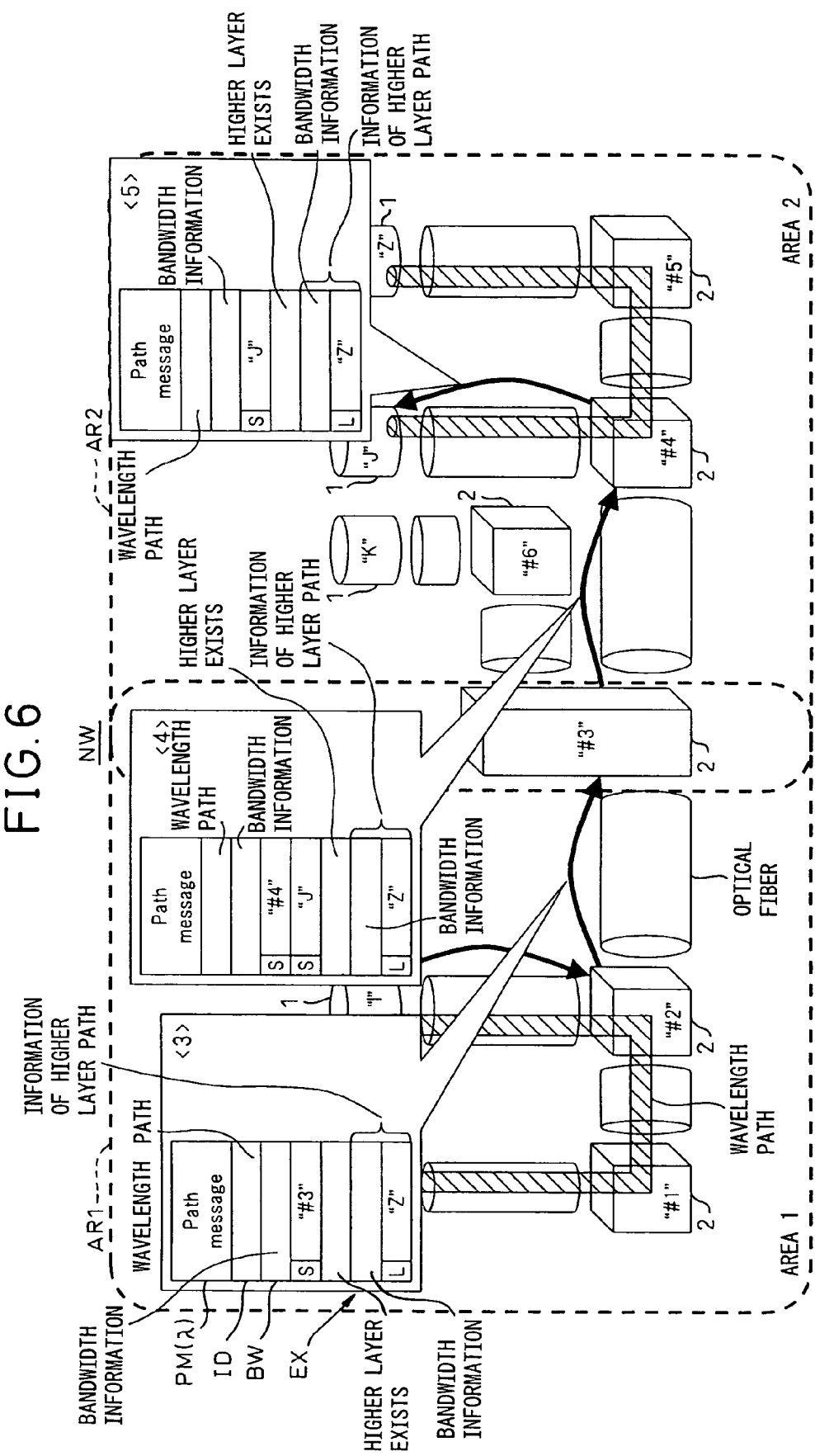
FIG. 6 is a view of Embodiment 2 based on the present invention (second)

FIG. 6 is the same view (second).

Figure 7:
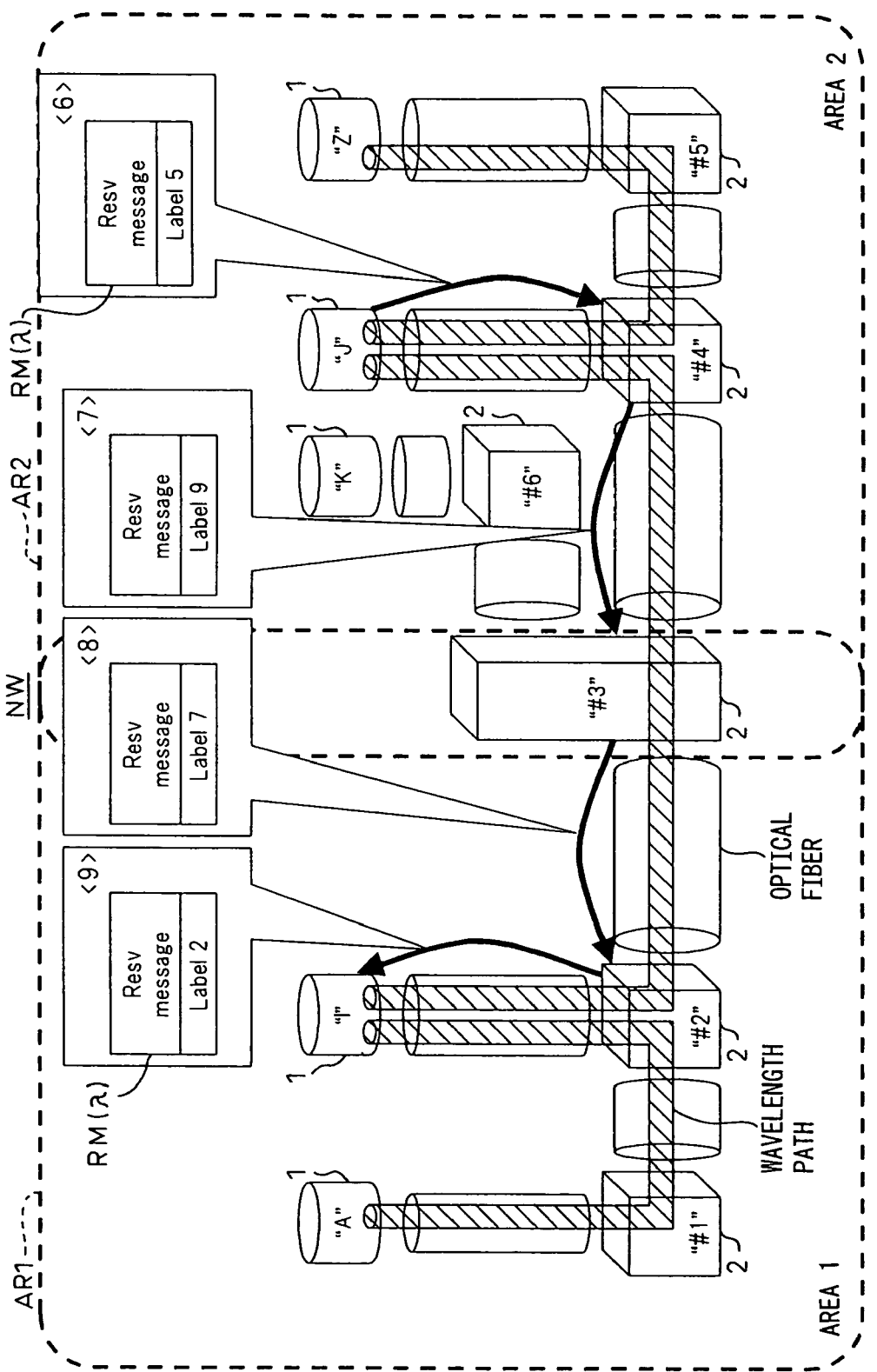
FIG. 7 is a view of Embodiment 2 based on the present invention (third)

FIG. 7 is the same view (third).

When looking at steps S21, S22, and S23 for the path setting method executed in Embodiment 2 expressed in FIG. 5, FIG. 6, and FIG. 7, they are as follows.

Step S21: Judging the existence of the possibility of reaching the second communication apparatus 1 "Z" in the higher layer in the repeating use communication apparatus 1 (for example "I") existing in the middle of the path, after the higher layer path setting request message PM(p) requesting path setting by the higher layer (for example the packet layer) from the first communication apparatus 1 "A" to the second communication apparatus 1 "Z" is originated.

Step S22: Generating the lower layer path setting request message PM(λ) requesting path setting by the lower layer in the repeating use communication apparatus 1 "I" when it is judged there is no possibility of reaching the apparatus in the above step S21, taking out the route designating information EX and the bandwidth information BW in the higher layer path setting request message PM(p) received at the apparatus "I", and transmitting the lower layer path setting request message PM(λ) (refer to <2> of FIG. 5) obtained by further adding the taken out information toward the second communication apparatus 1 "Z".

Step S23: Notifying the lower layer path setting request message PM(λ) transmitted in the above step S22 to each repeating use communication apparatus ("#2", "#3", "#4", and "J" in the figure) on the route reaching the second communication apparatus 1 "Z".

By this, as shown in FIG. 6, the path by the packet layer can be set between the communication apparatuses 1 "A" and 1 "Z".

The characterizing role when performing the path setting mentioned above is played by the communication apparatus 2 "#3".

Figure 8:
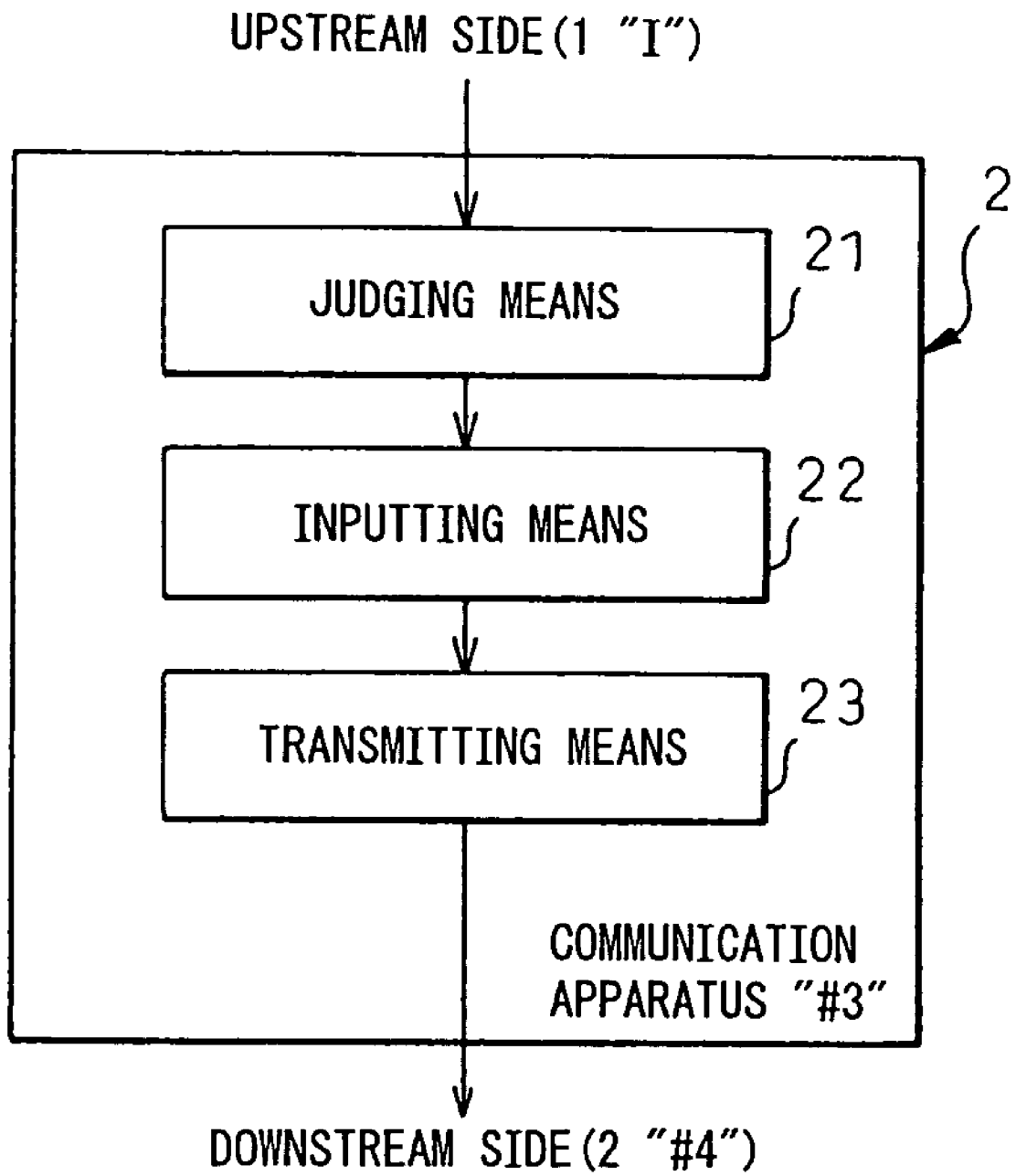
FIG. 8 is a functional block diagram of a communication apparatus 2 "#3" in Embodiment 2.

FIG. 8 is a functional block diagram of the communication apparatus 2 "#3" in Embodiment 2.

Referring to the present figure, the communication apparatus 2 "#3" is provided with at least a judging means 21, an inputting means 22, and a transmitting means 23.

The judging means 21 receives the lower layer path setting request message PM(λ) from another communication apparatus 1 "I" on the upstream side and judges if the route designating information EX and the bandwidth information BW included in the higher layer path setting request message PM(p) received at the communication apparatus 1 "I" is added in this received message.

The inputting means 22 takes out the route designating information EX and the bandwidth information BW judged as "added" in the judging means 21 and inputs this to the mechanism (known route calculating mechanism) determining the route of the path of the lower layer to be set on the downstream side.

The transmitting means 23 generates the lower layer path setting request message PM(λ) including the path route designating information EX based on the determination in the above mechanism and, at the same time, adds the route designating information EX and the bandwidth information BW included in the higher layer path setting request message PM(p) thereto and transmits the same.

The above Embodiment 2 will be explained in further detail.

The communication network NW shown in FIG. 5 and FIG. 6 has two layers of the packet layer and the wavelength layer. A packet path is formed on the wavelength path in the hierarchy.

Further, assume as follows: This communication network NW is divided into two areas AR1 and AR2 as shown in the figure. Each communication apparatus knows the information of the topology and resources in the area to which it belongs. However, each communication apparatus does not hold the information of the topology and resources out of that area and knows only through which area boundary apparatus (for example communication apparatus 2 "#3") it can reach the communication apparatus out of the area.

Here, assume that the packet switch 1 "A" receives the setting request of the packet path from "A" to "Z" from an operator etc. of the network. Then, the switch 1 "A" generates the path setting request message PM(p) for the packet layer. This message PM(p) is sent to the packet switch "I" by the designation of the explicit route EX as shown in for example <1> of FIG. 5.

This packet switch "I" performs the following processing.

1. It is judged that there is no next hop which can be reached by the packet layer from the packet switch 1 "I" to "Z", therefore it is determined to temporarily keep the processing of the path setting request message PM(p) of the packet layer at this switch 1 "I" waiting and set the path of the wavelength layer as the lower layer and generate the path setting request message PM(λ) for the path of this wavelength layer.

2. The explicit route designating information EX and the bandwidth information BW in the message PM(p) are taken out at the packet switch 1 "I", and the taken out information is stored together with a flag ("higher layer exists" in <2> of FIG. 5) indicating that the information of the higher layer is included in the wavelength path setting request message PM(λ).

Namely, this message PM(λ) is sent to the communication apparatus 2 (hereinafter, also referred to as the wavelength switch) "#2" with the explicit route EX as shown in for example <2> of FIG. 5.

This wavelength switch 2 "#2" can determine the next hop with only the explicit route of the wavelength layer, therefore, as shown in <3> of FIG. 6, the received route designating information EX and the bandwidth information BW of the path of the packet layer is included in the wavelength path setting request message PM(λ) to be transmitted and sent to the wavelength switch 2 "#3".

This wavelength switch 2 "#3" performs the following processing.

1. The next hop cannot be determined from the explicit route in the received wavelength layer setting request message PM(λ), therefore it is confirmed whether or not the requested route designating information EX and the bandwidth information BW of the path of the higher layer tunneled by the path of the lower layer is included.

2. It is seen from the above confirmation that the route designating information EX and the bandwidth information BW of the path of the higher layer exist, therefore, by inputting these information to the known route calculation mechanism (algorithm), the sought route of path is calculated. Note that, here, assume that the route "#3"→"#4"→"J" is calculated.

By such a procedure, even when calculating the continuation of the route of a path in the middle of the path of the lower layer, the information of the path concerning the request from the operator etc. can be utilized.

3. The received route designating information EX and bandwidth information BW of the path of the higher layer are included in the wavelength layer path setting request message PM(λ) to be transmitted from the packet switch 2 "#3" as shown in <4> of FIG. 6.

Thus, the message PM(λ) is sent to the wavelength switch 2 "#4" according to the explicit route shown in <4> of FIG. 6.

This wavelength switch 2 "#4" can determine the next hop by only the explicit route of the wavelength layer, therefore, as shown in <5> of FIG. 6, the received route designating information EX and bandwidth information BW of the path of the packet layer are included in the wavelength path setting request message PM(λ) to be transmitted which is then sent to the packet switch 2 "J".

The packet switch 1 "J" has the capability of terminating the wavelength path, but does not have the capability of repeating the wavelength path, so terminates the wavelength path here.

Then, next, as shown in FIG. 7, by the same mechanism as that of the prior art for the path setting request message, the wavelength path setting acknowledgement message RM(λ) is returned toward the switch 2 "#4" from the switch 1 "J", and finally the wavelength path is set between "I" and "J".

Thereafter, the processing of the path setting operation of the packet layer kept waiting at 1 "I" is restarted according to the same procedure as that of the prior art.

Embodiment 3

Figure 9:
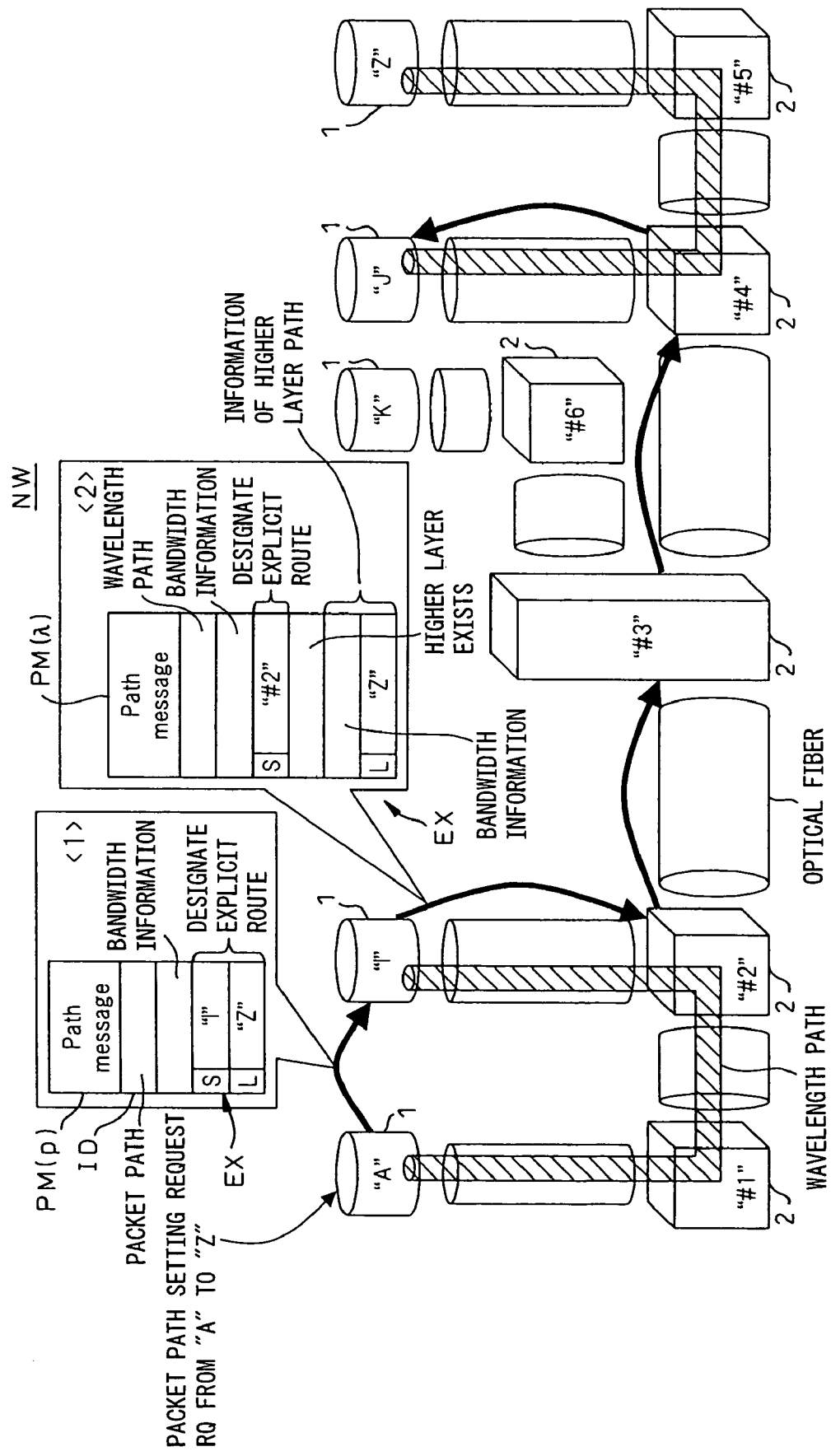
FIG. 9 is a view of Embodiment 3 based on the present invention (first)
Figure 10:
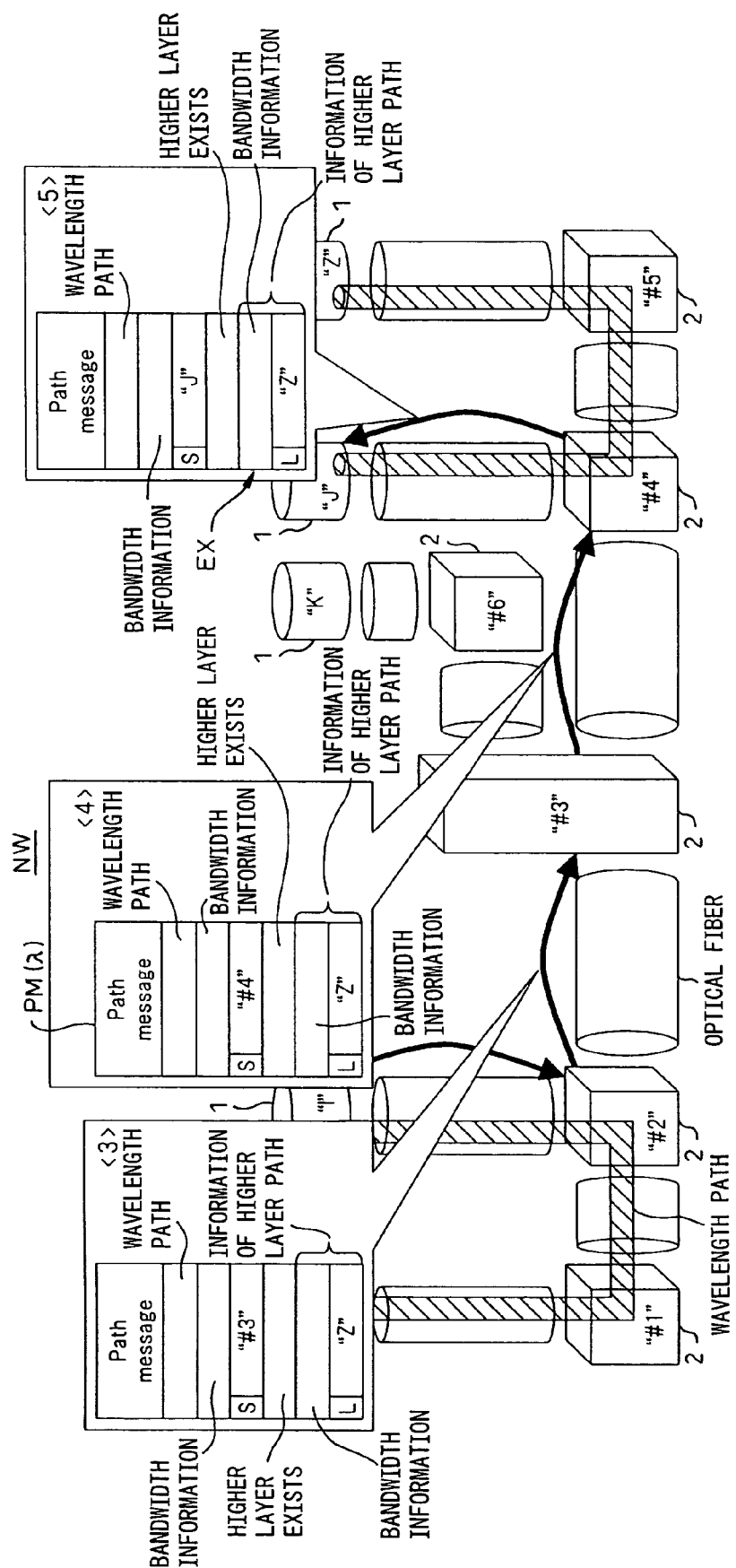
FIG. 10 is a view of Embodiment 3 based on the present invention (second)

FIG. 9 is a view of Embodiment 3 based on the present invention (first);

FIG. 10 is the same view (second); and

Figure 11:
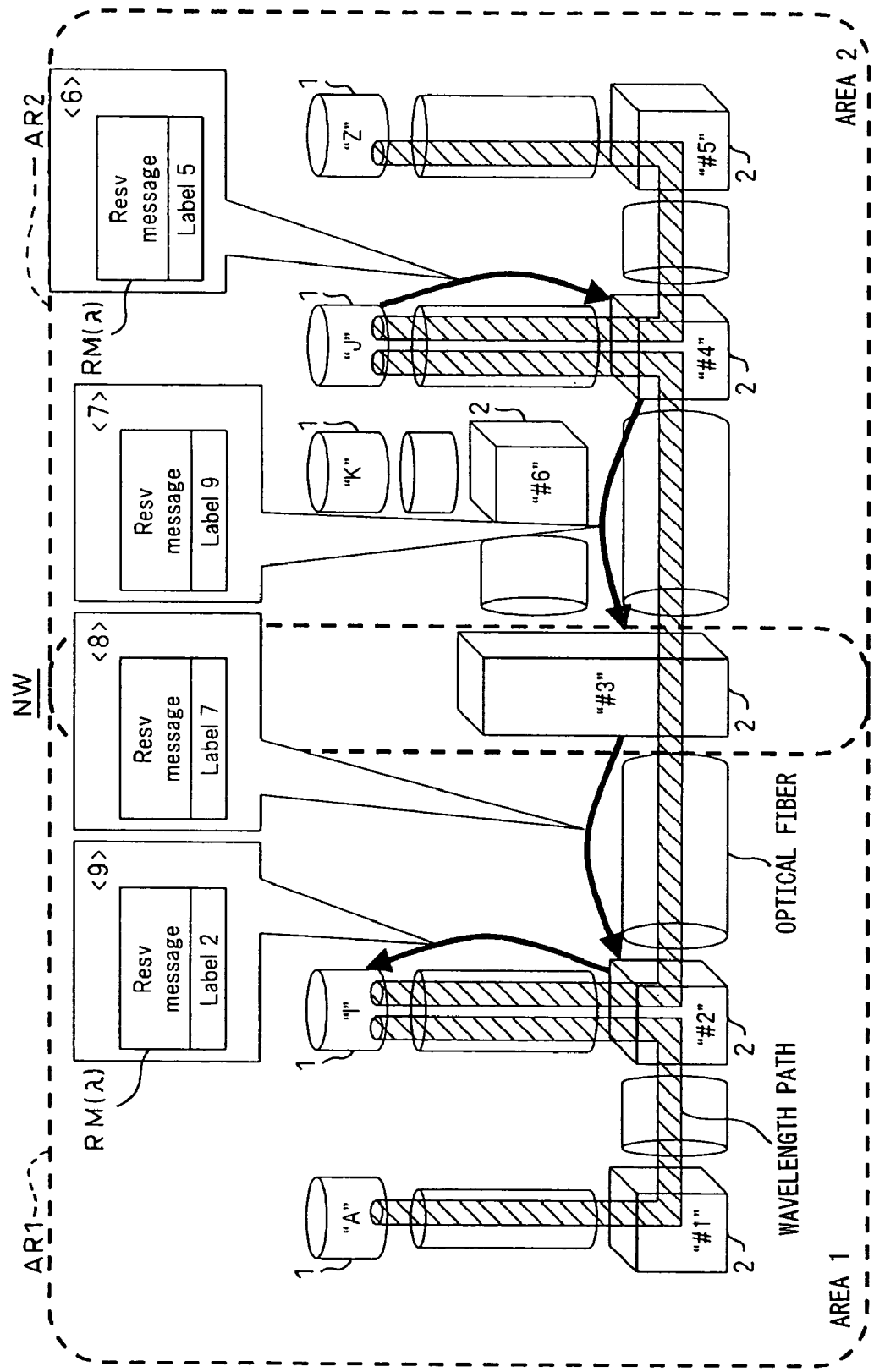
FIG. 11 is a view of Embodiment 3 based on the present invention (third)

FIG. 11 is the same view (third).

The present Embodiment 3 is a modification of the above Embodiment 2. The difference of the two resides in that the areas (above explained AR1 and AR2) are not considered in Embodiment 3. That is, the area in Embodiment 3 is regarded as one network.

In such a network, under the dispersed routing protocol, the topology information etc. are flooded and a transmission delay occurs. This causes competition of resources. Then, finally, competition of the bandwidth and label occurs between communication apparatuses and the signaling ends unsuccessfully.

FIG. 9 to FIG. 11 show how the present invention can avoid such a problem. Below, Embodiment 3 will be explained in detail by referring to FIG. 9 to FIG. 11.

In the communication network NW, the communication apparatuses 1 and 2 know the information of all topologies and resources of the network, but taking into account the delay due to flooding by the dispersed routing protocol explained above, do not designate an explicit route exceeding 1 hop except for a request from the operator etc. Namely, it is assumed that each communication apparatus has an explicit route up to only the adjoining communication apparatus, and each communication apparatus calculates the route hop by hop.

Assume that the packet switch 1 "A" receives a setting request of the packet path from "A" to "Z" from the operator etc. of the network. Then, the switch 1 "A" generates the path setting request message PM(p) for the packet layer. This message PM(p) is designated in the explicit route EX as shown in <1> of FIG. 9 due to the designation of 1 hop described above. This is sent to the packet switch 1 "I". Then, the packet switch 1 "I" performs the following processing.

1. It is judged that the next hop which can be reached by the packet layer does not exist from the packet switch 1 "I" to "Z", therefore it is determined to temporarily keep the processing of the path setting request message PM(p) of the packet layer at this switch 1 "I" waiting and set the path of the wavelength layer as the lower layer. The path setting request message PM($\lambda$) for the path of this wavelength layer is generated.

2. The explicit route designating information EX and the bandwidth information BW in the message PM(p) are taken out, and the taken out information is stored in the wavelength path setting request message PM($\lambda$) together with the flag ("higher layer exists" in <2> of FIG. 9) indicating that the information of the higher layer is included.

Namely, this message PM($\lambda$) is sent to the wavelength switch 2 "#2" with the explicit route EX as shown in for example <2> of FIG. 9. Then, this wavelength switch 2 "#2" performs the following processing.

1. The next hop cannot be determined from the explicit route in the received wavelength layer path request message PM($\lambda$), therefore, it is confirmed whether or not the setting request message PM(p) of the path of the higher layer tunneled by the path of the lower layer which is requested is included.

2. It is learned by the above confirmation that the path setting request message PM(p) of the higher layer is included, therefore, the route designating information EX and the bandwidth information BW are taken out from that, this is input to the already mentioned route calculating mechanism (algorithm), and the route of the path is calculated. Note that, here, assume that the route such as "#2"→"#3"→"#4"→"J" is calculated.

3. The received path setting information of the higher layer is included in the wavelength layer path request message PM($\lambda$) to be transmitted as shown in <2> of FIG. 9.

As mentioned before, each communication apparatus 1 in the communication network NW does not designate an explicit route exceeding 1 hop, therefore, the message as shown in <3> of FIG. 10 is transmitted from the switch 1 "I".

The same processing is carried out also in the wavelength switches 2 "#3" and 2 "#4", and the messages as shown in <4> and <5> of FIG. 10 are transmitted.

The packet switch 1 "J" receives the message, but this "J" has only the capability of terminating the wavelength path and does not have the capability of repeating the wavelength path, so terminates the wavelength path here.

Then, next, as shown in FIG. 11, by the same mechanism as that of the prior art for the path setting request message, the wavelength path setting acknowledgement message PM($\lambda$) is returned from the switch 1 "J" toward the switch 2 "#4", and finally the wavelength path is set between "I" and "J" (FIG. 11).

After this, by the same procedure as that of the prior art, the processing of the path setting of the packet layer waited at "I" is restarted.

Embodiment 4

Figure 12:
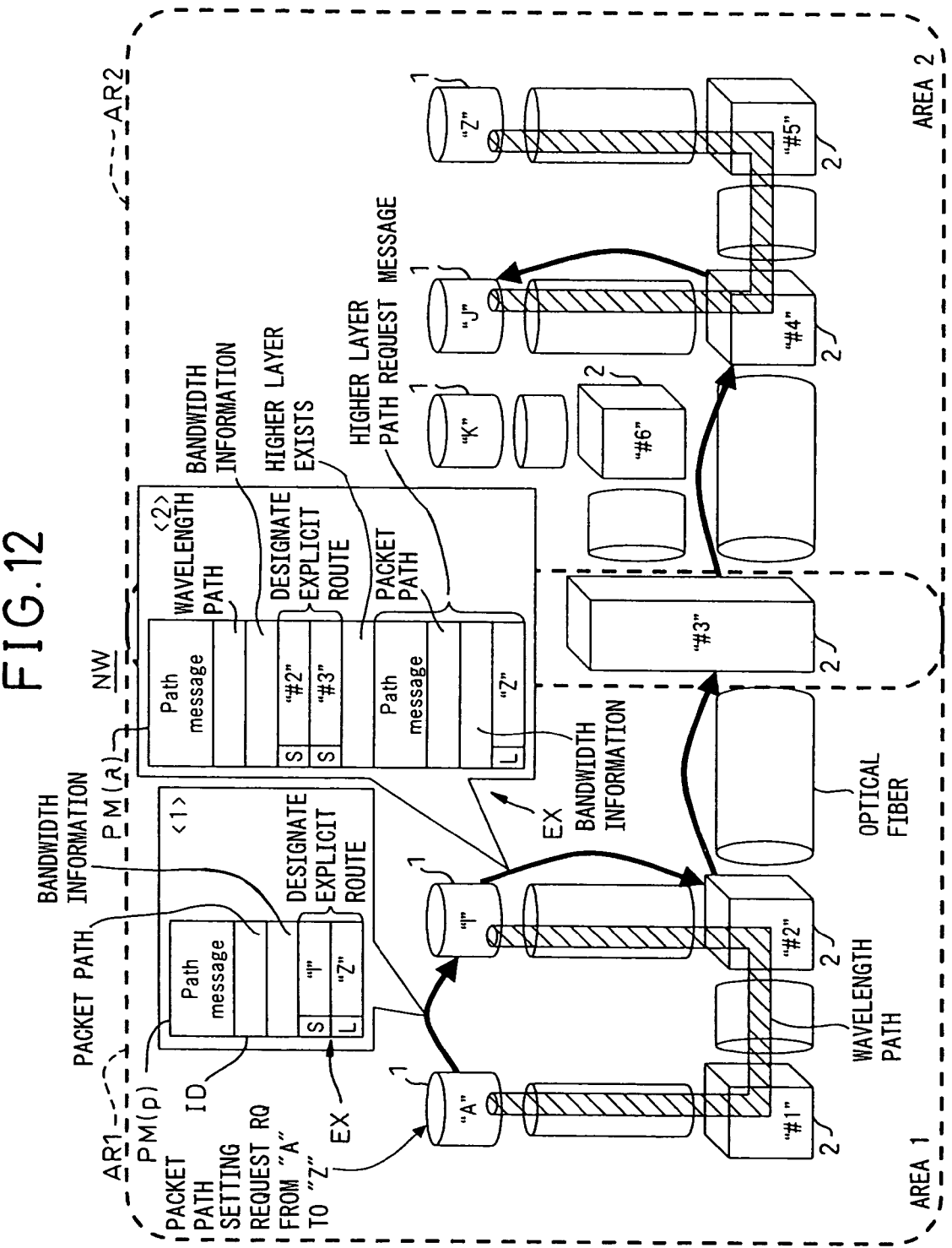
FIG. 12 is a view of Embodiment 4 based on the present invention (first)
Figure 13:
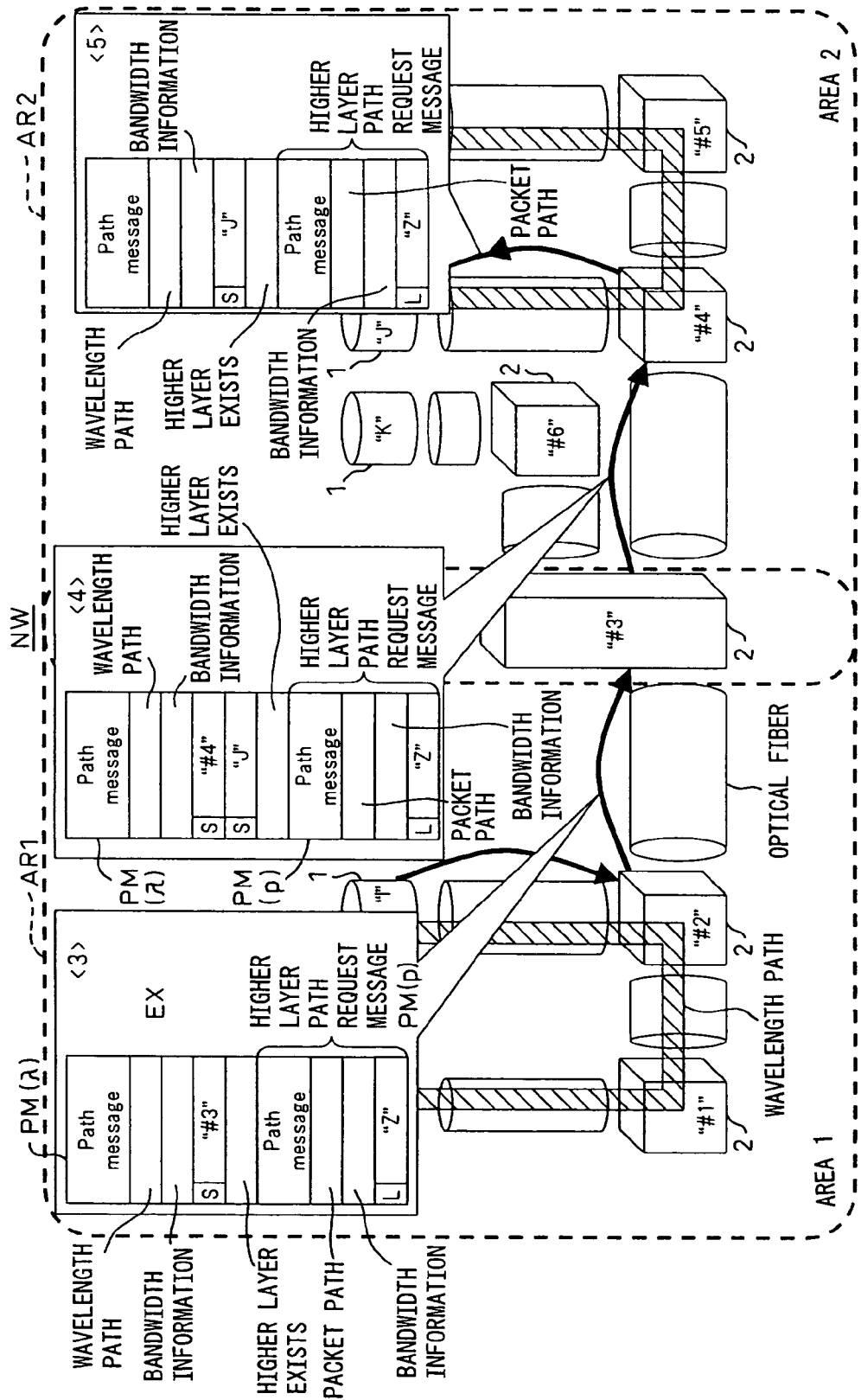
FIG. 13 is a view of Embodiment 4 based on the present invention (second)
Figure 14:
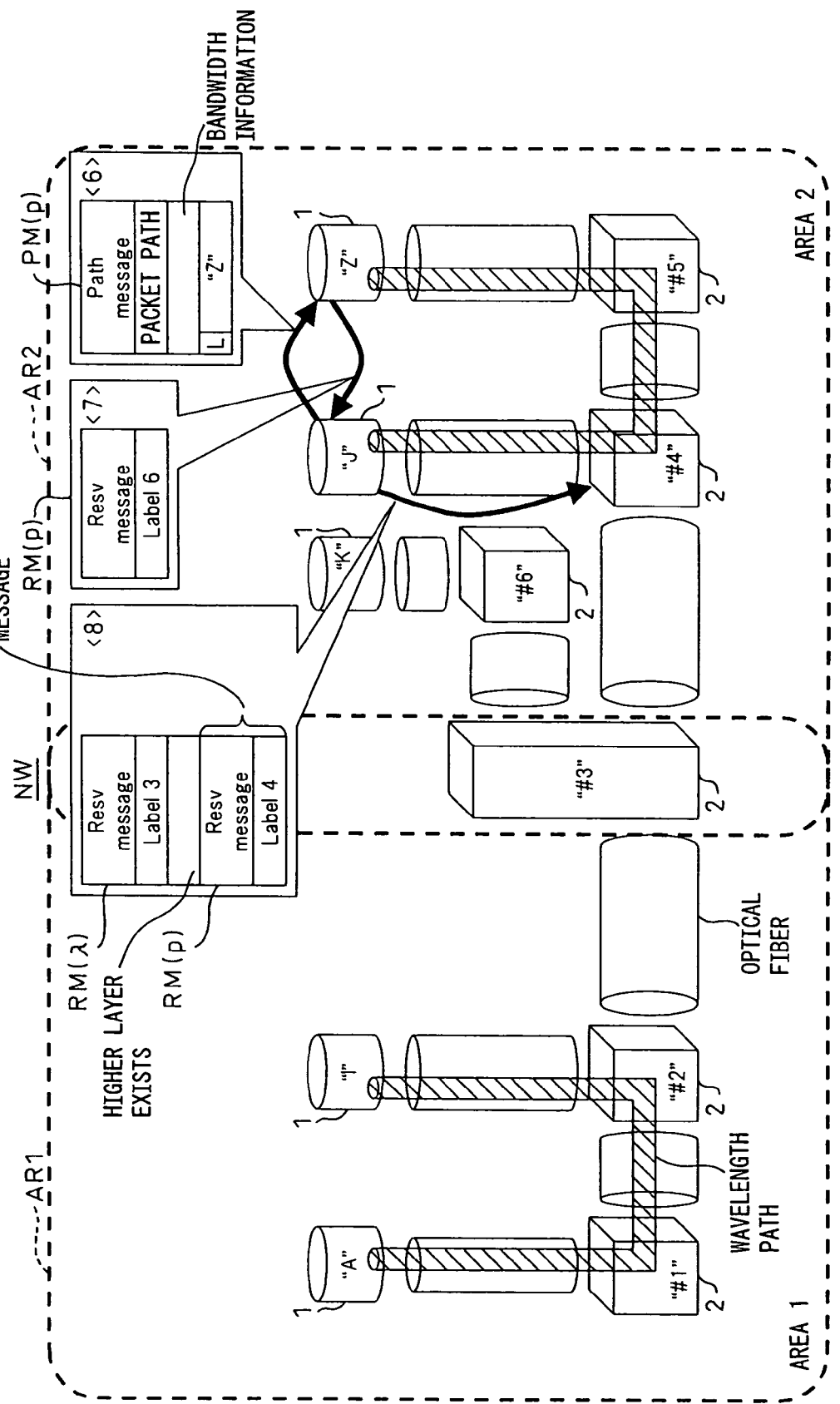
FIG. 14 is a view of Embodiment 4 based on the present invention (third)

FIG. 12 is a view of Embodiment 4 based on the present invention (first);

FIG. 13 is the same view (second);

FIG. 14 is the same view (third); and

Figure 15:
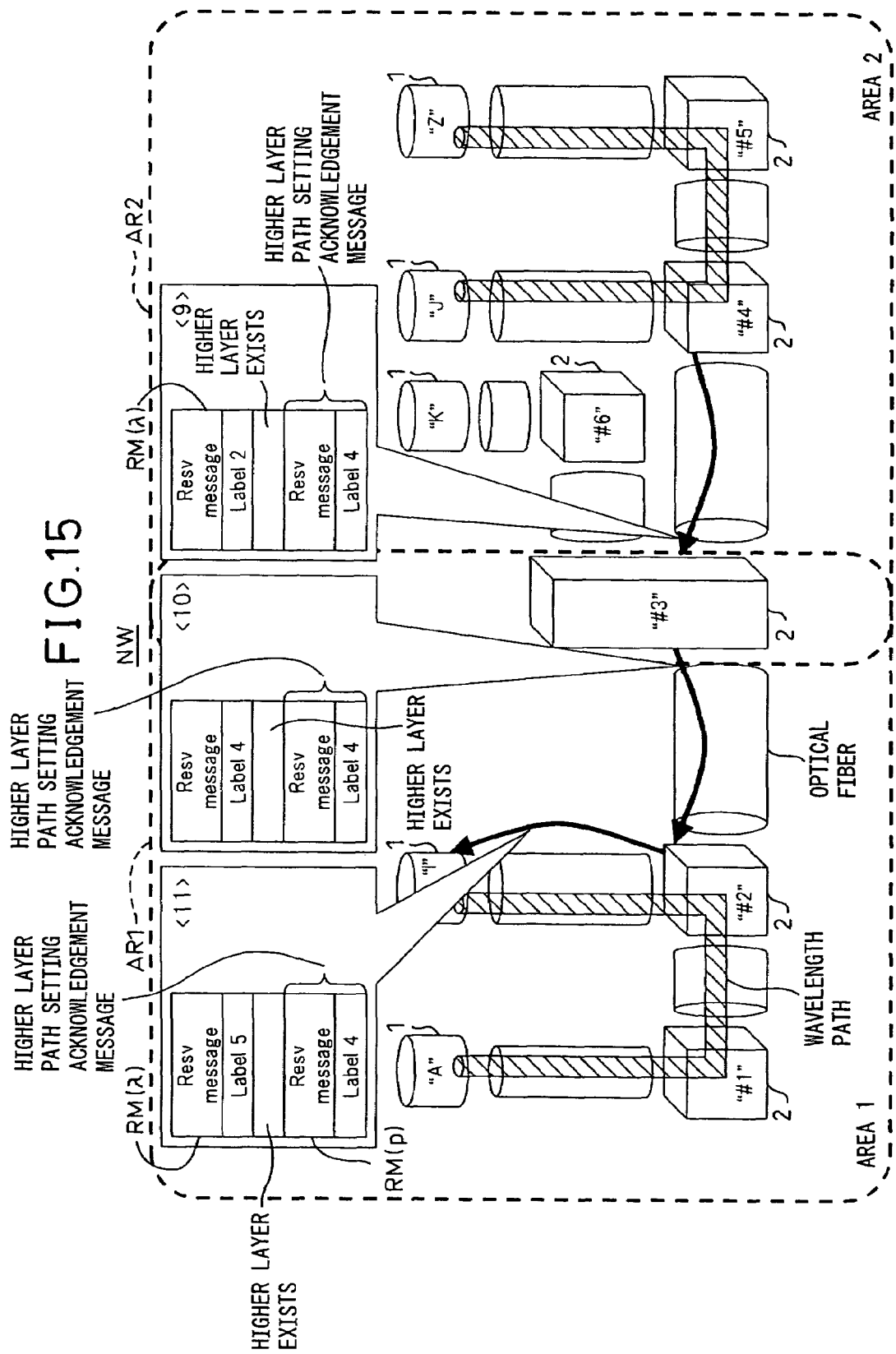
FIG. 15 is a view of Embodiment 4 based on the present invention (fourth)

FIG. 15 is the same view (fourth).

Looking at the path setting operation executed in Embodiment 4 expressed in FIG. 12 to FIG. 15, it is as follows:

First, the communication network to which the path setting method is applied is a communication network having paths of the higher layer and paths of the lower layer formed in a hierarchy in the same way as the above mentioned case and performing communication between the first communication apparatus and the second communication apparatus for which the path setting is carried out through at least one other communication apparatus in the middle, wherein the path setting method has at least following steps S31, S32, and S33, and further steps S34 and S35.

Step S31: Judging existence of possibility of reaching the second communication apparatus 1 "Z" in the higher layer in the repeating use communication apparatuses 1 or 2 existing in the middle of the path, after the higher layer path setting request message PM(p) requesting the path setting by the higher layer from the first communication apparatus 1 "A" to the second communication apparatus 1 "Z" is originated.

Step S32: When it is judged there is no possibility of reaching the above apparatus in the above step S31, the repeating use communication apparatus generates the lower layer path setting request message PM($\lambda$) requesting the path setting by the lower layer, then combines the received higher layer path setting request message PM(p) itself with the lower layer path setting request message PM($\lambda$) as it is and transmits this toward the second communication apparatus 1 "Z".

Step S33: The higher layer/lower layer path setting request message combined with the higher layer path setting request message transmitted in the above step S32 is notified to each above repeating use communication apparatus on the route reaching the second communication apparatus 1 "Z".

Further, the following steps D34 and S35 then continue.

Step S34: The second communication apparatus 1 "Z" generates a higher layer path setting acknowledgement message responding to the above higher layer path setting request message received through the above step S33 and returns this onto the above route.

Step S35: The repeating use communication apparatus in the next stage generates a lower layer path setting acknowledgement message responding to the lower layer path setting request message and, at the same time, combines the above returned higher layer acknowledgement message with this and notifies the thus obtained higher/lower layer path setting acknowledgement message to each repeating use communication apparatus on the route reaching the first communication apparatus 1 "A".

The communication apparatuses playing the characteristic roles when performing the above-mentioned path setting operation are the apparatuses cited in the following explanation, that is:

(i) "I" of FIG. 12;
(ii) "J" of FIG. 14;
(iii) "J" of FIG. 13;
(iv) 2 "#3" of FIG. 13; and
(v) 2 "#3" of FIG. 15.

Figure 16:
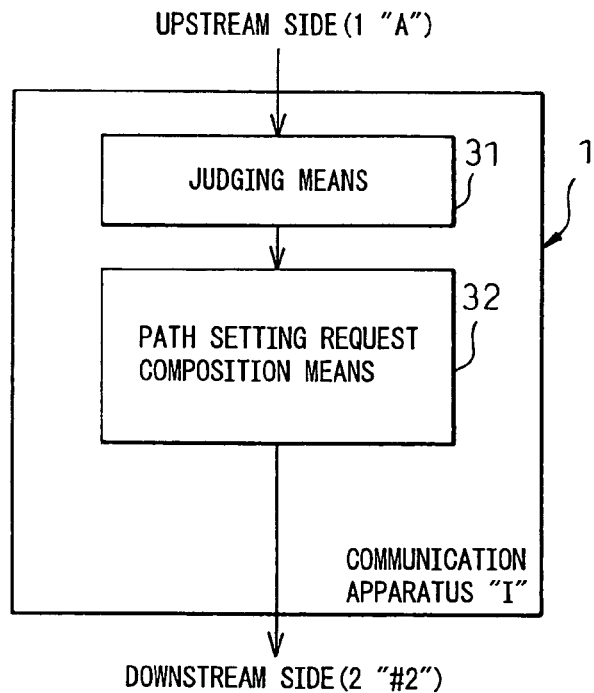
FIG. 16 is a functional block diagram of the communication apparatus 1 "I" of FIG. 12.
Figure 17:
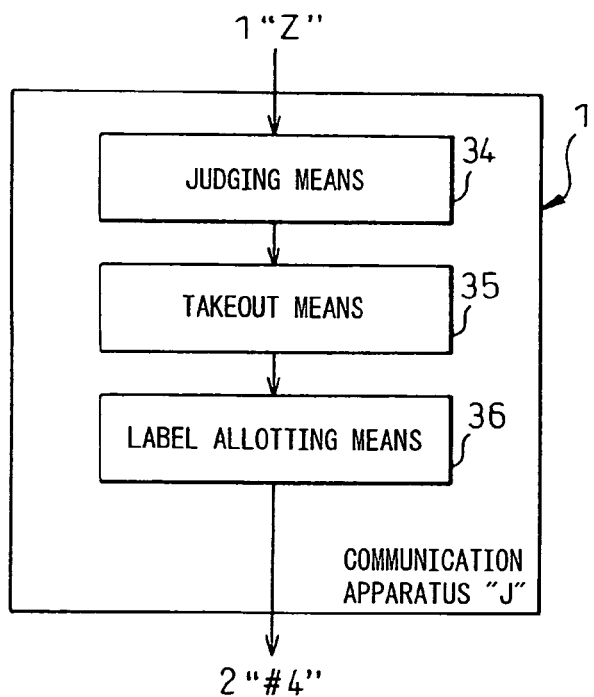
FIG. 17 is a functional block diagram of a communication apparatus 1 "J" of FIG. 14.
Figure 18:
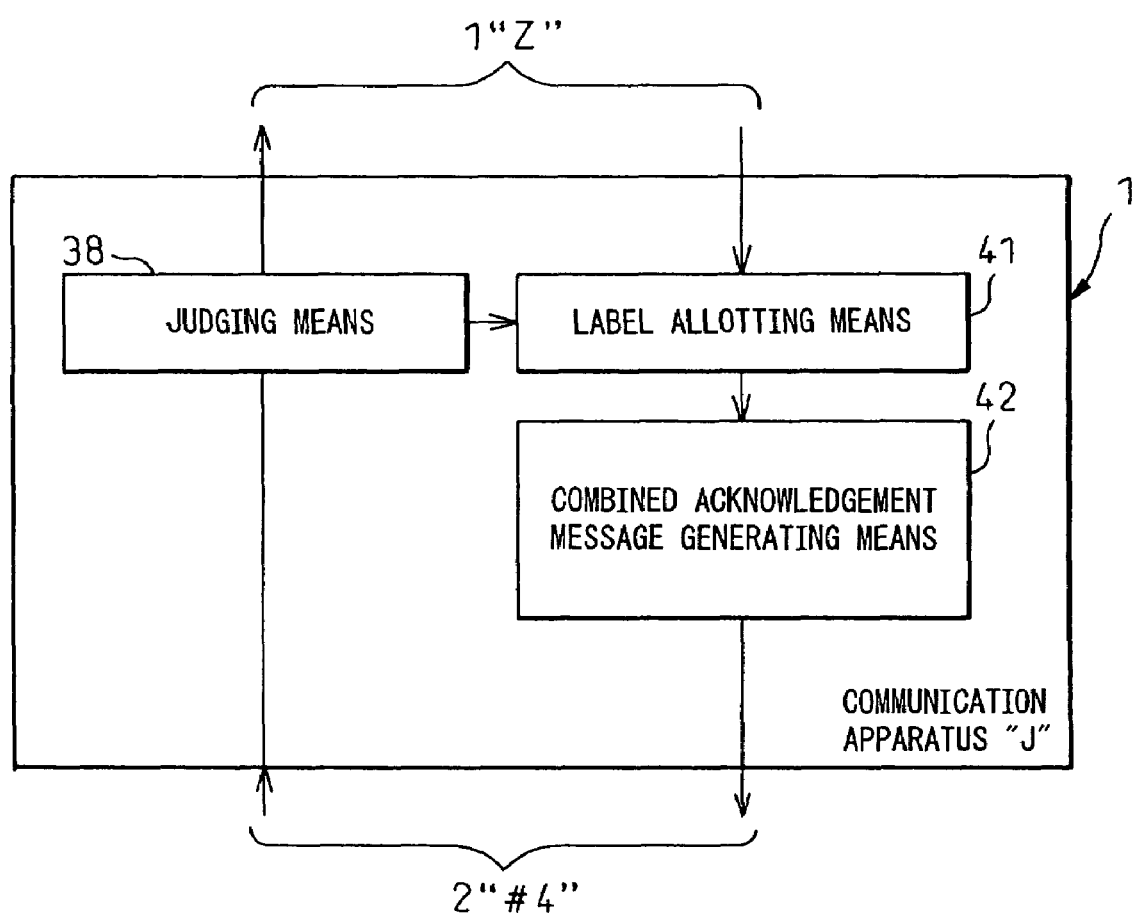
FIG. 18 is a functional block diagram of a communication apparatus 1 "J" of FIG. 13.
Figure 19:
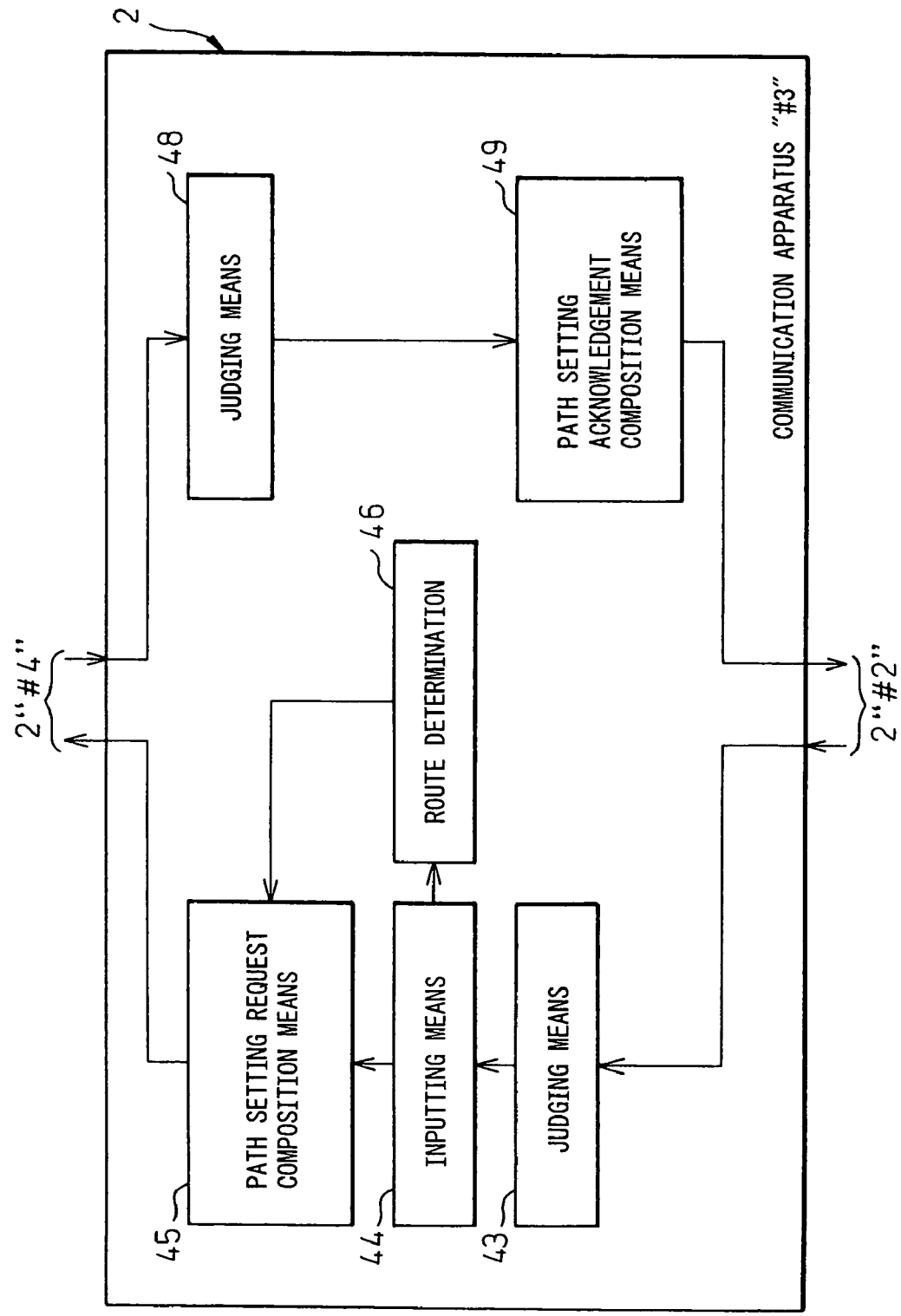
FIG. 19 is a functional block diagram of the communication apparatus 2 "#3" in FIG. 13 and FIG. 15.

FIG. 16 is a functional block diagram of the communication apparatus 1 "I" of FIG. 12;

FIG. 17 is a functional block diagram of the communication apparatus 1 "J" of FIG. 13;

FIG. 18 is a functional block diagram of the communication apparatus 1 "J" of FIG. 13; and FIG. 19 is a functional block diagram of the communication apparatus 2 "#3" of FIG. 13 and FIG. 15.

Referring to FIG. 16 first, the communication apparatus 1 "I" of FIG. 15 is provided with at least a judging means 31 and a path setting request composition means 32.

The judging means 31 receives a higher layer path setting request message PM(p) from another communication apparatus 1 "A" on the upstream side and judges the existence of the necessity of setting the path of the lower layer for opening the path up to the destination of communication 1 "Z" designated in this received message.

When it is judged that "the necessity exists" in the judging means 31, the path setting request composition means 32 generates the related lower layer path setting request message PM(λ) and, at the same time, combines the received higher layer path setting request message PM(p) with this PM(λ) and transmits this toward the destination of communication 1 "Z"

Referring to FIG. 17 next, the communication apparatus 1 "J" of FIG. 14 is provided with at least a judging means 34, a takeout means 35, and a label allotting means 36.

The judging means 34 receives the lower layer path setting acknowledgement message RM(λ) directed to the upstream side (1 "A") from another communication apparatus 1 "J" on the downstream side and judges whether or not the higher layer path setting acknowledgement message RM(p) is included in this received message.

The takeout means 35 takes out the higher layer path setting acknowledgement message RM(p) judged as "included" by this judging means 34.

The label allotting means 36 allots the label corresponding to the message RM(p) taken out as described above.

Referring to FIG. 18 next, the communication apparatus 1 "J" of FIG. 13 is provided with at least a judging means 38, a label allotting means 41, and a composite acknowledgement message generating means 42.

The judging means 38 judges whether or not the higher layer path setting request message PM(p) transmitted on the upstream side (1 "A") is combined with the lower layer path setting request message PM(λ) received from another communication apparatus (2 "#4") on the upstream side.

The label allotting means 41 allots the label to the path corresponding to the higher/lower layer path setting request message judged as "combined" by the judging means 38. This allotted label is the generalized label including also the wavelength, time slot, etc.

The composite acknowledgement message generating means 42 generates the higher/lower layer path acknowledgement message including the allotted label for each path of the higher/lower layer.

Referring to FIG. 19 next, the communication apparatus 2 "#3" of FIG. 13 is provided with at least a judging means 43, an inputting means 44, and a path setting request composition means 45 on the one hand. Further, on the other hand, it is provided with at least a judging means 48 and a path setting acknowledgement composition means 49.

When looking at the left side of the present figure first, the judging means 43 judges whether or not the higher layer path setting request message PM(p) transmitted on the upstream side (1 "A") is combined with a lower layer path setting request message PM(λ) received from another communication apparatus (2 "#2") on the upstream side.

The inputting means 44 takes out the route designating information EX and bandwidth information BW judged as "combined" in the judging means 43 and inputs this to the mechanism 46 for determining the route of the path of the lower layer to be set on the downstream side.

The path setting request composition means 45 generates the lower layer path setting request message PM(λ) including the route designating information EX by the above determination and, at the same time, combines the received higher layer path setting request message PM(p) with this and transmits this toward the destination of communication (1 "Z").

Next, when looking at the right side of the present figure, the judging means 48 receives the lower layer path setting acknowledgement message PM(λ) directed to the upstream side (1 "A") from another communication apparatus (2 "#4") on the downstream side and judges whether or not the higher layer path setting acknowledgement message PM(p) is included in this received message.

The path setting acknowledgement composition means 49 further generates the lower layer path setting acknowledgement message RM(λ) to be returned to the upstream side (1 "A") and, at the same time, combines the higher layer path setting acknowledgement message PM(p) judged as "included" by the judging means 48 with this generated message as it is and transmits this toward the upstream side.

The above mentioned Embodiment 4 will be explained in further detail.

The communication network NW shown in FIG. 12 to FIG. 15 has two layers of the packet layer and the wavelength layer as already mentioned. A packet path is formed on the wavelength path in the hierarchy.

Further, this communication network NW is also divided into two areas AR1 and AR2. Each communication apparatus knows the information of the topology and resources in the area to which this communication apparatus belongs. However, it does not hold the information of the topology and resources out of that area and knows only through which area boundary apparatus (for example 2 "#3") it can reach a communication apparatus out of the area.

Here, assume that the packet switch 1 "A" receives the setting request of the packet path from "A" to "Z" from an operator etc. of the network. Then, the switch 1 "A" generates the path setting request message PM(p) for the packet layer. This message is designated in the explicit route EX as shown in for example <1> of FIG. 12 and sent to the packet switch 1 "I". This packet switch 1 "I" performs the following processing.

1. It is judged that the next hop which can be reached by the packet layer does not exist from the packet switch 1 "I" to "Z", therefore it is determined to set the path of the wavelength layer as the lower layer, and the path setting request message for the path of this wavelength layer is generated.

2. The path setting request message PM(p) of the packet layer is combined with the path setting request message PM(λ) of the wavelength layer together with a flag indicating that the information of the higher layer is included ("higher layer exists"). This message has the explicit route EX as shown in for example <2> of FIG. 12 and is sent to the wavelength switch 2 "#2".

This wavelength switch 2 "#2" can determined the next hop by using only the explicit route EX of the wavelength layer, so combines the received path setting request message PM(p) of the packet layer with the wavelength path setting request message PM(λ) to be transmitted as shown in <3> of FIG. 13 and sends this to the wavelength switch 2 "#3". This wavelength switch 2 "#3" performs the following processing.

1. The next hop cannot be determined from the explicit route EX in the received wavelength layer path request message PM(λ), therefore it is confirmed whether or not the path setting request message PM(p) of the higher layer tunneled by the path of the lower layer which is requested is combined.

2. It is seen from the above confirmation that the path setting request message PM(p) of the higher layer is combined, therefore the route designating information and the bandwidth information are taken out from this and input to the route calculating mechanism 46 for determining the route mentioned before, and the route of the path is calculated. Note that, here, assume that the route such as "#3"→"#4"→"J" is calculated.

3. The received path setting request message PM(p) of the higher layer is combined with the wavelength layer path request message PM(λ) to be transmitted.

Thus, the higher/lower layer composition message is sent to the wavelength switch 2 "#4" according to the explicit route as in <4> of FIG. 13.

This wavelength switch 2 "#4" can determine the next hop with only the explicit route of the wavelength layer, so combines the received path setting request message PM(p) of the packet layer with the wavelength path setting request message PM(λ) to be transmitted as shown in <5> of FIG. 13 and sends this to the packet switch 1 "J".

The packet switch 1 "J" has the capability of terminating the wavelength path, but does not have the capability of repeating the wavelength path, therefore terminates the wavelength path here and performs the following processing.

1. It confirms whether or not the path setting request message PM(p) of the higher layer is combined with the received wavelength path setting request message PM(λ).

2. It processes the received wavelength path setting request message PM(λ), allots the generalized label to this, and generates the wavelength path setting acknowledgement message RM(λ). The path setting request message PM(p) of the higher layer is combined with this, therefore, the transmission of the generated wavelength path setting acknowledgement message(λ) is kept waiting at this 1 "J" until it becomes possible to transmit the path setting acknowledgement message RM(p) of the higher layer.

3. It separates the path setting request message PM(p) of the higher layer from the received wavelength path setting request message PM(λ) and adds its own identifier ID to the head of the explicit route designation.

4. The separated above packet path setting request message is processed and sent toward the packet switch 1 "Z" as shown in <6 of FIG. 14. In this packet switch 1 "Z", the received packet path setting request message is processed in the same way as that of the prior art, and the packet path setting acknowledgement message RM(p) is returned to the packet switch 1 "J" as in <7> of FIG. 14. This packet switch 1 "J" performs the following processing.

1. It processes the received path setting acknowledgement message RM(p) and generates the packet path setting acknowledgement message to be transmitted.

2. It confirms if there is a path setting acknowledgement message of the lower layer kept waiting for the packet path setting acknowledgement message RM(p) to be transmitted.

3. Since there is the switch (switch 1 "J" of FIG. 14) waiting for the path setting acknowledgement message of the lower layer, it combines the packet path setting acknowledgement message RM(p) with this message as well a flag indicating that the information of the higher layer is included ("the higher layer exists") as shown in <8> of FIG. 14. This path acknowledgement message (<8> of FIG. 14 described above) is further sent to the wavelength switch 2 "#4". This wavelength switch 2 "#4" performs the following processing.

1. It processes the received path setting acknowledgement message and generates the wavelength path setting acknowledgement message to be transmitted.

2. In this case, it confirms whether or not the above received path setting acknowledgement message is combined with the path setting acknowledgement message of the higher layer.

3. By the above confirmation, the above received path setting acknowledgement message RM(λ) is accompanied by the path setting acknowledgement message RM(p) of the higher layer, therefore, as in <9> of FIG. 15, it combines the path setting acknowledgement message R(p) of the higher layer with the wavelength path setting acknowledgement message RM(λ) to be transmitted.

Further, in the wavelength switches 2 "#3" and 2 "#2" on the upstream side, the same processing as described above is carried out, and the acknowledgement messages <10> and <11> of FIG. 15 are generated and sent. In this way, when the packet switch 1 "I" receives the wavelength path setting acknowledgement message RM(λ), this switch 1 "I" performs the following processing.

1. It processes the received wavelength path setting acknowledgement message RM(λ).

2. It confirms whether or not the path setting acknowledgement message RM(p) is switched with the received wavelength path setting acknowledgement message RM(λ).

3. It is seen by the above confirmation that the path setting acknowledgement message of the related higher layer is included, therefore this is separated and processed. Namely, the generalized label is set in the forwarding table FT or the wavelength switch/converting unit (FIG. 28), and the path setting acknowledgement message to be sent toward the switch 1 "A" is generated.

4. It returns the generated path setting acknowledgement message to the switch 1 "A".

In the case where the communication apparatus (1 "I") determining the setting of the path of the wavelength layer by confirming that the next hop which can be reached by the packet layer does not exist cannot give sufficient route designating information for the path of the wavelength layer by using the above mentioned procedures, the path of a plurality of layers can be set by the number of times of transfer of the message smaller than that of the prior art by the combination of the two messages described above.

Embodiment 1 to Embodiment 4 based on the present invention were explained above. Finally, a further specific explanation will be given of FIG. 3, FIG. 4, FIG. 8, and FIG. 16 to FIG. 19 shown in these embodiments.

FIG. 20 to FIG. 24 explained below show the conceptual functional blocks shown in FIG. 3, FIG. 4, FIG. 8, FIG. 16 to FIG. 19 described above more specifically according to the actual situation.

Figure 20:
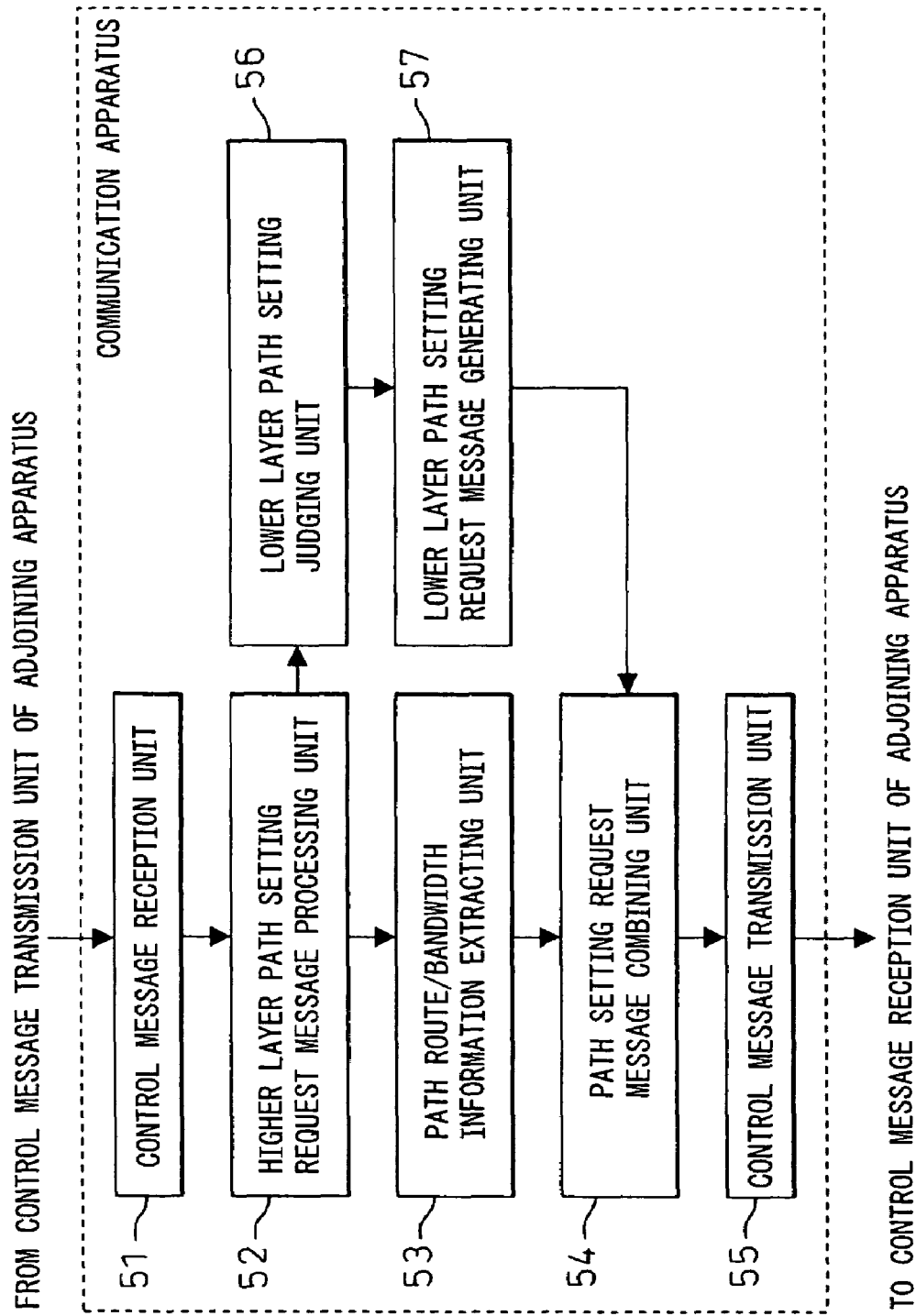
FIG. 20 is a block diagram specifically showing the functions expressed in FIG. 4.
Figure 21:
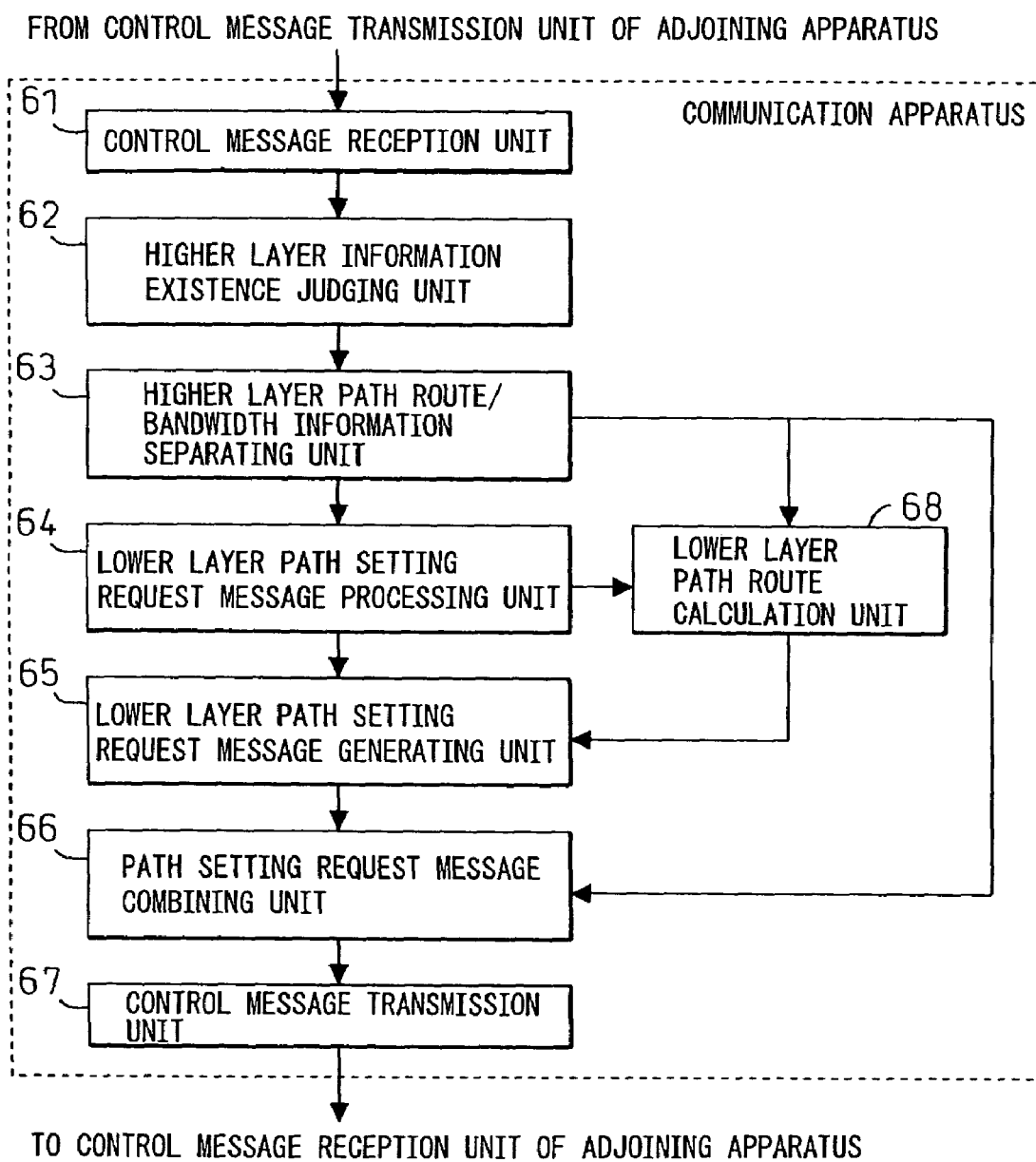
FIG. 21 is a block diagram specifically showing the functions expressed in FIG. 8.
Figure 22:
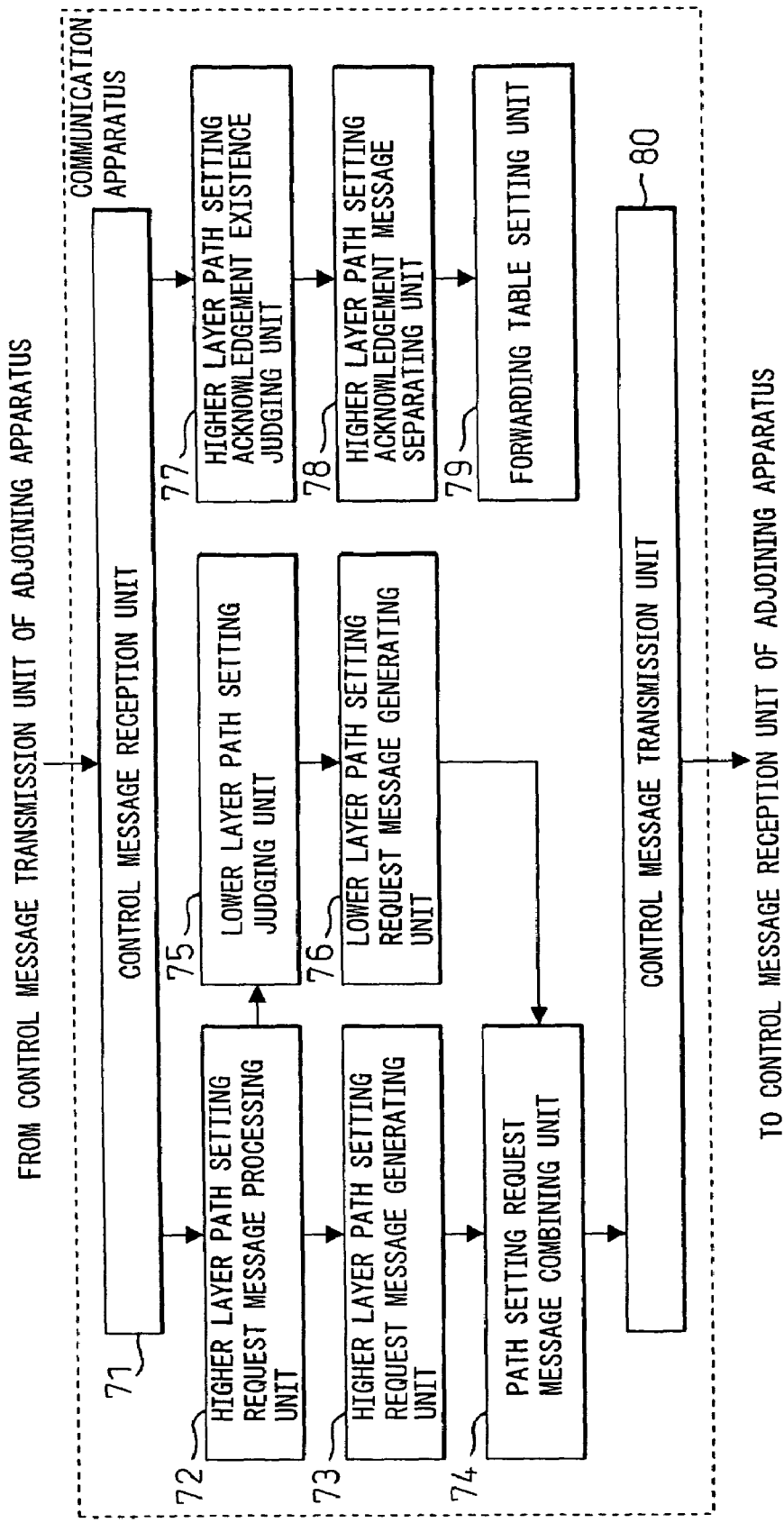
FIG. 22 is a block diagram specifically showing the functions expressed in FIG. 16 and FIG. 17.
Figure 23:
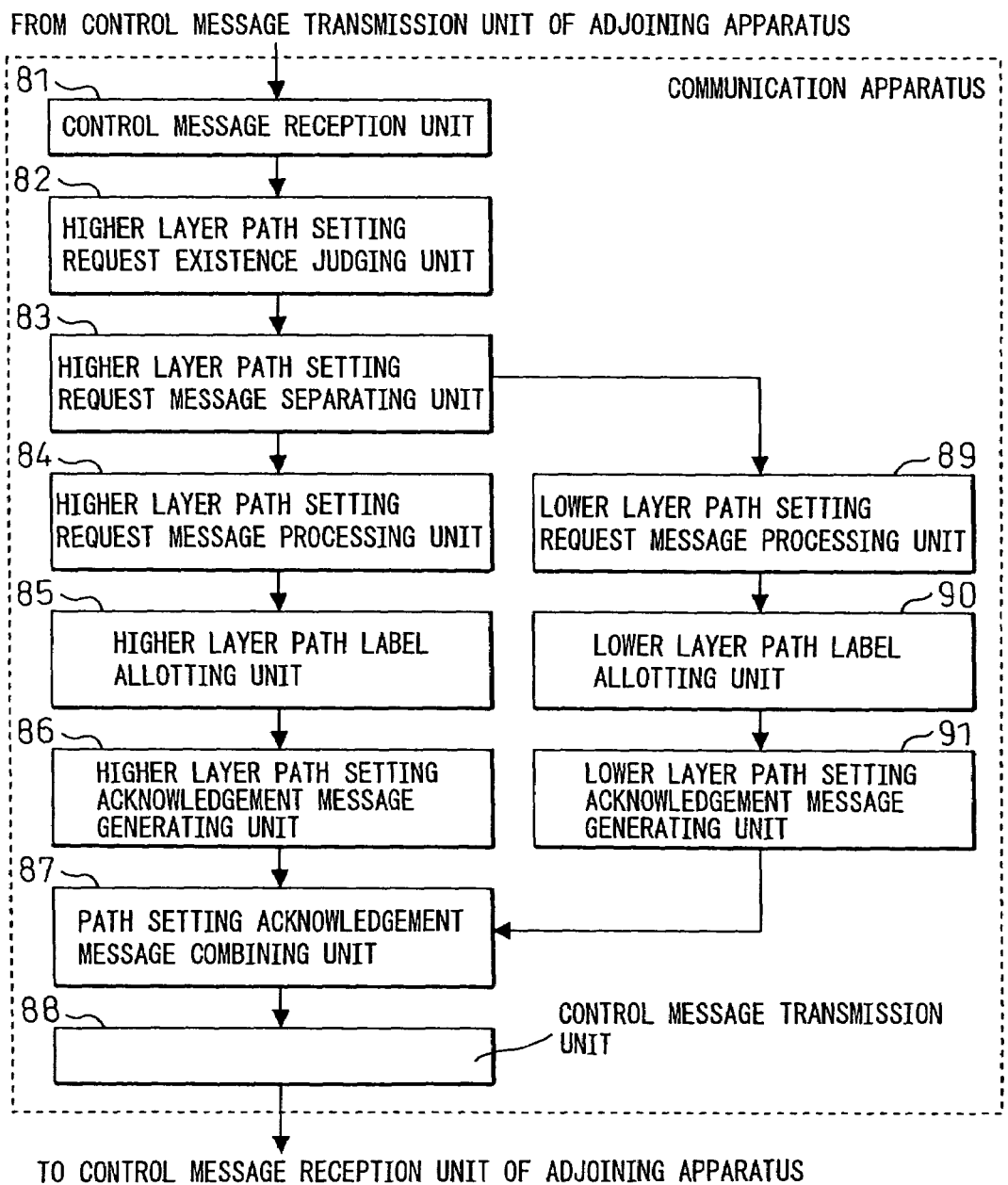
FIG. 23 is a block diagram specifically showing the functions expressed in FIG. 18.
Figure 24:
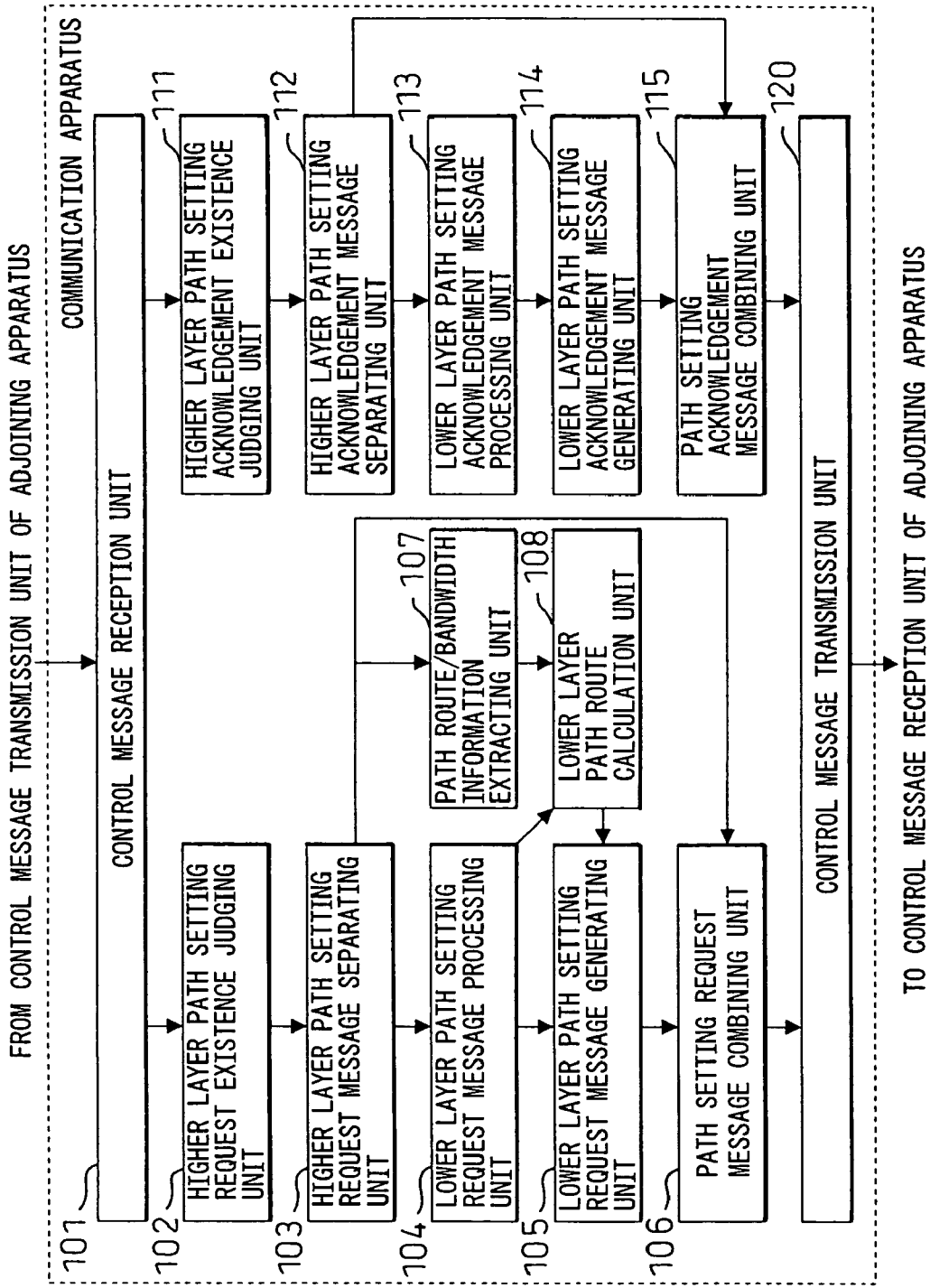
FIG. 24 is a block diagram specifically showing the functions expressed in FIG. 19.

FIG. 20 is a block diagram specifically showing the functions expressed in FIG. 4;

FIG. 21 is a block diagram specifically showing the functions expressed in FIG. 8;

FIG. 22 is a block diagram specifically showing the functions expressed in FIG. 16 and FIG. 17;

FIG. 23 is a block diagram specifically showing the functions expressed in FIG. 18; and FIG. 24 is a block diagram specifically showing the functions represented in FIG. 19.

Refer to FIG. 20 first.

The path setting request message received through the control message reception unit 51 is processed at the higher layer path setting request message processing unit 52. When the requested path cannot be provided by only this higher layer, the received path setting request message is sent to the lower layer path setting judging unit 56 and the path route/bandwidth information extracting unit 53.

The lower layer path setting judging unit 56 judges whether or not the path of the lower layer is to be set. When it is judged to set the path of the lower layer, it outputs the message generation request to the lower layer path setting request message generating unit 57.

When receiving the message generation request, the lower layer path setting request message generating unit 57 generates a path setting request message for the path of the lower layer and sends this to the path setting request message combining unit 54.

The path route/bandwidth information extracting unit 53 extracts the route designating information and the bandwidth information from the received path setting request message and sends them to the path setting request message combining unit 54.

This path setting request message combining unit 54 combines the received path setting request message of the lower layer and the route designating information and bandwidth information of the higher layer path and generates the message to be transmitted.

The control message transmission unit 55 sends the generated message toward the adjoining communication apparatus.

Refer to FIG. 21 next. Note that portions achieving the same functions are represented by same names in FIG. 20 described above and the following FIG. 21 to FIG. 24. Note that even the same named portion may be assigned a different notation whenever the figure number changes.

The path setting request message received through the control message reception unit 61 is judged at the higher layer information existence judging unit 62 as to whether or not it includes information of the higher layer. When it is judged to include the information of the higher layer, the above-described message is sent to the higher layer path route/bandwidth information separation unit 63.

This higher layer path route/bandwidth information separation unit 63 separates the received path setting request message to the path setting request message for the lower layer path and the route/bandwidth information of the higher layer path. Then, the separated path setting request message for the lower layer path is sent to the lower layer path setting request message processing unit 64, while the separated route/bandwidth information of the higher layer path is sent to the lower layer path route calculation unit 68 and the path setting request message combining unit 66.

The lower layer path setting request message processing unit 64 processes the received path request message. When it is necessary, for example when the communication apparatus to which the message is to be sent next is not determined, it instructs the lower layer path route calculation unit 68 to calculate the route. Further, it instructs the lower layer path setting request message generating unit 65 to generate the path setting request message.

The lower layer path route calculation unit 68 receives as input the information transferred from the lower layer path setting message processing unit 64 and the route/bandwidth information of the higher layer path and calculates the route.

The lower layer path setting request message generating unit 65 generates the path setting request message for the lower layer based on the message generation request from the processing unit 64 and the output from the route calculation unit 68 and sends this to the path setting request message combining unit 66.

This path setting request message combining unit 66 combines the received path setting request message for the lower layer and the route/bandwidth information of the higher layer path and generates the message to be transmitted.

The control message transmission unit 67 transmits this generated message toward the adjoining communication apparatus.

Refer to FIG. 22 next.

The path setting request message received through the control message reception unit 71 is processed at the higher layer path setting request message processing unit 72. When it is judged that the requested path cannot be provided by only this higher layer, it sends the path setting request message to the lower layer path setting judging unit 75 and, at the same time, requests the generation of the path setting request message to the higher layer path setting request message generating unit 73.

The lower layer path setting judging unit 75 judges whether or not the path of the lower layer is to be set and, when judging the setting of the path of the lower layer, issues a message generation request to the lower layer path setting request message generating unit 76.

This lower layer path setting request message generating unit 76 generates a path setting request message for the path of the lower layer when receiving the message generation request and sends this to the path setting request message combining unit 74.

On the other hand, the higher layer path setting request message generating unit 73 generates a path setting request message for the path of the higher layer when receiving the message generation request and sends this to the path setting request message combining unit 74.

This path setting request message combining unit 74 combines the received path setting request message of the lower layer and the higher layer path setting request message and generates the request message to be transmitted.

Further, the control message transmission unit 80 transmits this generated request message toward the adjoining communication apparatus.

On the other hand, the path setting acknowledgement message received through the control message reception unit 71 is judged at the higher layer path setting acknowledgement existence judging unit 77 as to whether or not a path setting acknowledgement message for the higher layer path is included in the received message. Where it is judged that this higher layer path setting acknowledgement message is included, the received message is sent to the higher layer path setting acknowledgement message separation unit 78.

This higher layer path setting acknowledgement message separation unit 78 separates the received message to the path setting acknowledgement message for the higher layer and the path setting acknowledgement message for the lower layer and sends them to the forwarding table (FT) setting unit 79.

This forwarding table setting unit 79 performs the setting of the switch based on the received path setting acknowledgement messages of the higher and lower layers.

Refer to FIG. 23 next.

The path setting request message received through the control message reception unit 81 is judged at the higher layer setting request existence judging unit 82 as to whether or not a path setting request message for the higher layer is included. When it is judged as "included", it sends the received request message to the higher layer path setting request message separation unit 83.

This higher layer path setting request message separation unit 83 separates the received path setting request message to the path setting request message for the lower layer path and the path setting request message for the higher layer. The path setting request message for the lower layer path is sent to the lower layer path setting request message processing unit 89, while the higher layer path setting request message is sent to the higher layer path setting request message processing unit 84.

This lower layer path setting request message processing unit 89 processes the path request message, and, when the request message is correctly processed, requests the allocation of the label to the lower layer path label allotting unit 90.

The higher layer path setting request message processing unit 84 processes the path request message and, if necessary, further sends the path setting request message toward the downstream side of the path. When the request message is correctly processed, it requests the allotting of the label to the higher layer path label allotting unit 85.

The lower layer path label allotting unit 90 receives the label allotting request, allots the generalized label for the lower layer, sends the allotted label to the lower layer path setting acknowledgement message generating unit 91, and requests the generation of the acknowledgement message.

On the other hand, the higher layer path label allotting unit 85 receives the label allotting request, allots the generalized label for the higher layer, sends the allotted label to the higher layer path setting acknowledgement message generating unit 86, and requests the generation of the acknowledgement message.

When receiving the generalized label allotted as described above, the lower layer path setting acknowledgement message generating unit 91 sends the path setting acknowledgement message including the label values (Label 2, Label 3, . . . , etc.) thereof to the path setting acknowledgement message combining unit 87.

On the other hand, when receiving the generalized label allotted as described above, the higher layer path setting acknowledgement message generating unit 86 sends the path setting acknowledgement message including the label values to the path setting acknowledgement message combining unit 87.

This path setting acknowledgement message combining unit 87 waits for the arrival of the path setting acknowledgement message of the higher layer corresponding to the path setting acknowledgement message of the lower layer from the downstream side, and when two of these messages of the lower layer and higher layer are arranged, outputs the combined acknowledgement message.

Further, the control message transmission unit 88 transmits the combined message toward the adjoining communication apparatus therefrom.

Finally, refer to FIG. 24.

The path setting request message received through the control message reception unit 101 is judged at the higher layer setting request existence judging unit 102 as to whether or not the path setting request message for the higher layer is included in the received request message. When it is judged as "included", it sends the received request message to the higher layer path setting request message separating unit 103.

This higher layer path setting request message separating unit 103 separates the received path setting request message to the path setting request message for the lower layer path and the path setting request message for the higher layer. The path setting request message for the lower layer path is sent to the lower layer path setting request message processing unit 104, while the higher layer path setting request message is sent to the path route/bandwidth information extracting unit 107 and the path setting request message combining unit 106.

The path route/bandwidth information extracting unit 107 extracts the route designating information and bandwidth information of the path from the received path setting request message and transfers them to the lower layer path route calculation unit 108.

The lower layer path setting request message processing unit 104 processes the path setting request message of the lower layer and, if necessary, instructs the route calculation to the lower layer route calculation unit 108 and, at the same time, requests the generation of the path setting request message to the lower layer path setting request message generating unit 105.

This lower layer path route calculation unit 108 calculates the route of the lower layer path based on the route designating information and the bandwidth information of the higher layer path transferred from the path route/bandwidth information extracting unit 107 according to the instruction of the route calculation of the lower layer path setting request message and transfers this calculation result to the lower layer path setting request message generating unit 105.

This lower layer path setting request message generating unit 105 generates the lower layer path setting request message based on the route designating information from the lower layer path route calculation unit 108 according to the request from the lower layer path setting request message processing unit 104 and transfers them to the path setting request message combining unit 106.

This path setting request message combining unit 106 combines the path setting request messages for the higher layer and the lower layer to complete the setting request message to be transmitted.

Further, the control message transmission unit 120 transmits this completed setting request message toward the adjoining communication apparatus.

On the other hand, the path setting acknowledgement message received through the control message reception unit 101 is judged at the higher layer path setting acknowledgement existence judging unit 111 as to whether or not it includes a path setting acknowledgement message for the higher layer path. When it is judged that this higher layer path setting acknowledgement message is included, the received setting acknowledgement message is sent to the higher layer path setting acknowledgement message separating unit 112.

This higher layer path setting acknowledgement message separating unit 112 separates the received setting acknowledgement message to the path setting acknowledgement message for the higher layer and the path setting acknowledgement message for the lower layer, transfers the separated higher layer path setting acknowledgement message to the path setting acknowledgement message combining unit 115, and transfers the separated lower layer path setting acknowledgement message to the lower layer path setting acknowledgement message processing unit 113.

This lower layer path setting acknowledgement processing unit 113 processes the lower layer path setting acknowledgement message and requests the generation of the acknowledgement message to the lower layer path setting acknowledgement message generating unit 114.

This lower layer path setting acknowledgement message generating unit 114 receives the generation request of the acknowledgement message and generates the path setting acknowledgement message for the path of the lower layer.

The path setting acknowledgement message combining unit 115 combines the path setting acknowledgement messages for the higher layer and the lower layer to generate the acknowledgement message to be transmitted.

Further, the control message transmission unit 120 transmits this generated acknowledgement message toward the adjoining communication apparatus.

As explained in detail above, according to the present invention, it becomes possible to utilize the information concerning a request from an operator or user at the time of route calculation of the path by solving the already mentioned first and second problems and possible to decrease the number of times of transfer of the path setting request message and the path setting acknowledgement message between the communication apparatuses.

The invention claimed is:

1. A path setting method in a communication network having a path of a higher layer and a path of a lower layer formed in a hierarchy and performing communication between a first communication apparatus and a second communication apparatus for which a path setting is carried out by repeating through at least another communication apparatus in the middle of the path, said path setting method in a communication network performing communication via a plurality of layers comprising:

judging existence of a possibility of reaching said second communication apparatus in said higher layer in said repeating use communication apparatus existing in the middle of the path, after a higher layer path setting request message requesting the path setting by said higher layer from said first communication apparatus to said second communication apparatus is originated;

generating a lower layer path setting request message requesting a path setting by said lower layer in said repeating use communication apparatus when it is judged there is no possibility of reaching said second communication apparatus in said "judging" step, then taking out route designating information and bandwidth information in said received higher layer path setting request message and transmitting said lower layer path setting request message and further adding the taken out information to said lower layer path setting request message to transmit the lower layer path setting request message toward said second communication apparatus; and notifying said lower layer path setting request message transmitted in said "generating" step to each said repeating use communication apparatus on a route reaching said second communication apparatus.

2. A path setting method in a communication network having a path of a higher layer and a path of a lower layer formed in a hierarchy and performing communication between a first communication apparatus and a second communication apparatus for which a path setting is carried out by repeating through at least another communication apparatus in the middle of the path, said path setting method in a communication network performing communication via a plurality of layers comprising:

judging existence of a possibility of reaching said second communication apparatus in said higher layer in said repeating use communication apparatus in the middle of the path, after a higher layer path setting request message requesting the path setting by said higher layer from said first communication apparatus to said second communication apparatus is originated;

generating a lower layer path setting request message requesting the path setting by said lower layer in said repeating use communication apparatus when it is judged there is no possibility of reaching the apparatus in said "judging" step, then combining the received higher layer path setting request message itself with said lower layer path setting request message as it is and transmitting a combined higher and lower layer path setting request message toward said second communication apparatus; and notifying the combined higher and lower layer path setting request message transmitted in said "generating" step to each said repeating use communication apparatus on a route reaching said second communication apparatus.

3. A path setting method as set forth in claim 2, further comprising:

generating a higher layer path setting acknowledgement message responding to said higher layer path setting request message received through said "notifying" step and returning this onto said route of said "notifying" step in said second communication apparatus; and generating a lower layer path setting acknowledgement message responding to said lower layer path setting request message in said repeating use communication apparatus in the next stage and, at the same time, combining said returned higher layer path setting acknowledgement message with said lower layer path setting acknowledgement message and notifying the combined higher and lower layer path setting acknowledgement message to each said repeating use communication apparatus on said route reaching said first communication apparatus.

4. A communication apparatus forming part of communication network having a path of a higher layer and a path of a lower layer formed in a hierarchy and performing the communication via the paths, comprising:

a judging function unit receiving a higher layer path setting request message from another communication apparatus on an upstream side and judging existence of the necessity of setting the path of the lower layer for opening the path up to a destination of communication designated in the above received higher layer path setting request message; and a higher path setting information adding function unit generating a lower layer path setting request message by computing a first lower layer path route to a next hop node of the path designation information of the received upper layer path setting request message, if the communication apparatus has enough topology and resource information to compute said first lower layer path route, while, computing a higher layer path route or a second lower layer path route that is nearest, accessible by the topology information possessed by the communication apparatus, to said next hop node, if the communication apparatus has not enough topology and resource information to compute said first lower layer path route, and, at the same time, based on results of the computing, adding route designating information and the bandwidth information of the path to be set on a downstream side to this message when it is judged in said judging function unit that the necessity exists.

5. A communication apparatus forming part of communication network having a path of a higher layer and a path of a lower layer formed in a hierarchy and performing communication via the paths, comprising:

a judging function unit receiving a lower layer path setting request message transmitted from another communication apparatus on an upstream side and judging whether or not route designating information and bandwidth information included in a higher layer path setting request message received at said other communication apparatus is added in the above received lower layer path setting request message;

an inputting function unit taking out said route designating information and bandwidth information judged to be added in said judging function unit and inputting these to a mechanism for determining the route of the path of the lower layer to be set on a downstream side to check whether or not there is a better lower layer destination node or lower layer route; and a transmitting function unit generating a lower layer path setting request message including path route designating information based on the determination in said mechanism and, at the same time, adding route designating information and bandwidth information included in said higher layer path setting request message to the above generated lower layer path setting request message and transmitting the resultant message by an addition.

6. A communication apparatus forming part of a communication network having a path of a higher layer and a path of a lower layer formed in a hierarchy and performing communication via the paths, comprising:

a judging function unit receiving a higher layer path setting request message from another communication apparatus on an upstream side and judging existence of necessity of setting the path of the lower layer for opening the path up to a destination of communication designated in the above received higher layer path setting request message; and a path setting request composition function unit generating a lower layer path setting request message by computing a first lower layer path route to a next hop node of the path designation information of the received upper layer path setting request message, if the communication apparatus has enough topology and resource information to compute said first lower layer path route, while, computing a higher layer path route or a second lower layer path route that is nearest, accessible by the topology information possessed by the communication apparatus, to said next hop node, if the communication apparatus has not enough topology and resource information to compute said first lower layer path route, and, at the same time, based on results of the computing, combining said received higher layer path setting request message with the lower layer path setting request message when it is judged that the necessity exists in said judging function unit and transmitting the combination toward said destination of communication.

7. A communication apparatus forming part of a communication network having a path of a higher layer and a path of a lower layer formed in a hierarchy and performing communication via the paths, comprising:

a request message judging function unit judging whether or not a higher layer path setting request message transmitted on an upstream side is combined with a lower layer path setting request message received from another communication apparatus on the upstream side;

an inputting function unit taking out route designating information and bandwidth information judged to be combined in said request message judging function unit and inputting this to the mechanism for determining the route of the path of the lower layer to be set on a downstream side; and a path setting request composition function unit generating a lower layer path setting request message including the route designating information by said determination and, at the same time, combining the above transmitted higher layer path setting request message with the above received lower layer path setting request message, and transmitting this toward said destination of communication.

8. A communication apparatus as set forth in claim 7, further comprising:

an acknowledgement message judging function unit receiving a lower layer path setting acknowledgement message directed to an upstream side from another communication apparatus on a downstream side and judging whether or not a higher layer path setting acknowledgement message is included in this received message; and a path setting acknowledgement composition function unit further generating a lower layer path setting acknowledgement message to be returned to the upstream side and, at the same time, combining said higher layer path setting acknowledgement message judged to be included by said acknowledgement message judging function unit with the generated message as it is and transmitting this toward the upstream side.

* * * * *